(12) United States Patent
Bardi et al.

(10) Patent No.: US 11,117,145 B2
(45) Date of Patent: Sep. 14, 2021

(54) ATOMIZER MIXING CHAMBER FOR A SEED TREATER

(71) Applicant: AG Growth International Inc., Winnipeg (CA)

(72) Inventors: Dan Bardi, Winnipeg (CA); Jeremy Ens, Winnipeg (CA); Zachary Johnson, Winnipeg (CA)

(73) Assignee: AG GROWTH INTERNATIONAL INC., Winnipeg (CA)

( * ) Notice: Subject to any disclaimer, the term of this patent is extended or adjusted under 35 U.S.C. 154(b) by 157 days.

(21) Appl. No.: 16/266,309

(22) Filed: Feb. 4, 2019

(65) Prior Publication Data

US 2019/0240686 A1    Aug. 8, 2019

Related U.S. Application Data

(60) Provisional application No. 62/625,587, filed on Feb. 2, 2018.

(51) Int. Cl.
*B05B 7/24* (2006.01)
*B01F 5/20* (2006.01)
*B01F 5/00* (2006.01)
*B01F 5/22* (2006.01)
*B05B 13/02* (2006.01)
(Continued)

(52) U.S. Cl.
CPC .............. *B05B 7/2489* (2013.01); *A01C 1/06* (2013.01); *B01F 3/0861* (2013.01); *B01F 5/0085* (2013.01); *B01F 5/0688* (2013.01); *B01F 5/205* (2013.01); *B01F 5/221* (2013.01); *B01F 5/223* (2013.01); *B01F 5/225* (2013.01); *B05B 3/1035* (2013.01); *B05B 3/1057* (2013.01);
(Continued)

(58) Field of Classification Search
CPC ... B05B 7/2489; B05B 13/025; B05B 3/1035; B05B 3/1057; B05B 3/1021; B01F 5/223; B01F 5/225; B01F 5/221; B01F 5/0085; B01F 5/205; B01F 3/0861; B01F 5/0688; B01F 2215/0009; B01F 5/065; A01C 1/06
USPC .................................................. 366/336–340
See application file for complete search history.

(56) References Cited

U.S. PATENT DOCUMENTS 2,618,539 A * 11/1952 Conta ..................... F23D 14/82
                                                                48/189.4
3,185,447 A *  5/1965 Hach ..................... B01F 5/0603
                                                                366/131
(Continued)

*Primary Examiner* — Tony G Soohoo
(74) *Attorney, Agent, or Firm* — Ware, Fressola, Maguire & Barber LLP

(57) ABSTRACT

An atomizer mixing chamber for a seed treater has a body having first and second inlets for receiving first and second treatment fluids. The atomizer mixing chamber has a first stage cup for receiving and combining the first and second treatment fluids to provide a combined fluid, the first stage cup comprising a first set of holes through which the combined fluid flows. The atomizer also has a second stage cup below the first stage cup for receiving the combined fluid from the first stage cup, wherein the second stage cup further mixes the combined fluid to provide a mixed fluid and wherein the second stage cup comprises a second set of holes through which the mixed fluid flows. The atomizer mixing chamber may include a third stage cup below the second stage cup for receiving the mixed fluid and having a third set of holes through which the mixed fluid exits from the atomizer.

**18 Cla

US 11,117,145 B2

Page 2

(51) Int. Cl.
  *B05B 3/10* (2006.01)
  *A01C 1/06* (2006.01)
  *B01F 3/08* (2006.01)
  *B01F 5/06* (2006.01)

(52) U.S. Cl.
  CPC .... B05B 13/025 (2013.01); *B01F 2215/0009* (2013.01); *B05B 3/1021* (2013.01)

(56) References Cited

U.S. PATENT DOCUMENTS

| | | | | |
|---|---|---|---|---|
| 3,288,052 | A * | 11/1966 | Hough | A23K 40/20 99/485 |
| 3,400,915 | A * | 9/1968 | Onishi | B01F 5/223 366/290 |
| 3,502,305 | A * | 3/1970 | Grun | A23P 10/20 366/317 |
| 3,526,391 | A * | 9/1970 | Church, Jr. | C08G 18/3812 366/340 |
| 3,701,619 | A * | 10/1972 | Appeldoorn et al. | B01F 5/0604 425/198 |
| 3,934,859 | A * | 1/1976 | Deve | B22C 5/02 366/170.4 |
| 3,941,355 | A * | 3/1976 | Simpson | B01F 5/0656 366/99 |
| 4,218,012 | A * | 8/1980 | Hamza | B01F 1/0022 239/10 |
| 4,337,895 | A * | 7/1982 | Gallen | B05B 3/10 239/214.13 |
| 4,361,407 | A * | 11/1982 | Pellegrini | B01F 5/0644 366/340 |
| 4,398,493 | A * | 8/1983 | Gillett | B05B 3/10 118/303 |
| 4,407,217 | A * | 10/1983 | Jackson | B05B 3/1057 118/24 |
| 4,453,832 | A * | 6/1984 | Schumacher | B01D 11/0257 366/171.1 |
| 4,514,095 | A * | 4/1985 | Ehrfeld | F16L 55/02718 138/42 |
| 4,729,665 | A * | 3/1988 | Goudy, Jr. | B01F 5/0604 261/DIG. 80 |
| 4,834,542 | A * | 5/1989 | Sherwood | B01F 7/1625 366/21 |
| 4,869,849 | A * | 9/1989 | Hirose | B01F 5/0682 261/78.2 |
| 4,874,400 | A * | 10/1989 | Jury | B01D 53/504 95/38 |
| 5,056,715 | A * | 10/1991 | Korsmeyer | B01F 7/00775 239/214 |
| 5,073,032 | A * | 12/1991 | Berion | B01F 13/1033 366/137.1 |
| 5,672,821 | A * | 9/1997 | Suzuki | G01F 1/684 138/42 |
| 5,685,639 | A * | 11/1997 | Green | B01F 13/0227 366/101 |
| 5,695,648 | A * | 12/1997 | Fassbender | B01D 21/0087 210/739 |
| 5,863,129 | A * | 1/1999 | Smith | B01F 5/0644 366/340 |
| 5,887,977 | A * | 3/1999 | Morikawa | B01F 5/0604 366/340 |
| 5,984,519 | A * | 11/1999 | Onodera | B01F 3/12 366/165.2 |
| 6,357,905 | B1 * | 3/2002 | Birchard | B01F 5/221 366/178.1 |
| 6,616,327 | B1 * | 9/2003 | Kearney | B01F 5/06 366/340 |
| 6,705,756 | B2 * | 3/2004 | Botrie | B01F 5/0613 222/136 |
| 6,722,780 | B2 * | 4/2004 | Stein | A61K 9/1075 138/40 |
| 6,971,787 | B2 * | 12/2005 | Botrie | B01F 5/0613 222/145.6 |
| 7,018,435 | B1 * | 3/2006 | Wentinck | B01F 5/0057 261/114.5 |
| 7,083,683 | B2 * | 8/2006 | Schneidereit | B05B 3/1014 118/320 |
| 7,276,215 | B2 * | 10/2007 | Muller | B01D 3/18 261/110 |
| 7,520,661 | B1 * | 4/2009 | Lawson | B01F 5/0604 138/42 |
| 7,789,108 | B1 * | 9/2010 | Lawson | B01F 13/0059 138/42 |
| 9,616,442 | B2 * | 4/2017 | Kaeb | B05B 12/087 |
| 10,357,432 | B2 * | 7/2019 | Dollinger | B05B 13/025 |
| 10,729,061 | B2 * | 8/2020 | Kaeb | A01C 1/06 |
| 2004/0130967 | A1 * | 7/2004 | Wolf | B01F 15/00941 366/340 |
| 2010/0276820 | A1 * | 11/2010 | Mogami | B01F 5/0604 261/74 |
| 2011/0085945 | A1 * | 4/2011 | Mochizuki | B01F 7/32 422/225 |
| 2013/0301379 | A1 * | 11/2013 | Neerincx | B01F 5/0644 366/340 |
| 2017/0164550 | A1 * | 6/2017 | Kaeb | B05B 3/1057 |
| 2019/0240686 | A1 * | 8/2019 | Bardi | B01F 5/221 |

* cited by examiner

ATOMIZER MIXING CHAMBER FOR A SEED TREATER

CROSS-REFERENCE TO RELATED APPLICATIONS

This application claims benefit to provisional patent application Ser. No. 16/266,309, filed 4 Feb. 2019, which is hereby incorporated by reference in its entirety.

TECHNICAL FIELD

The present invention relates generally to agricultural seed treaters and more specifically to techniques for mixing and distributing the flow of seed treatment fluid in a seed treater.

BACKGROUND

Treating seeds with a liquid coating is a technique that is well known in agriculture. Various types of treatment liquids may be applied to the seeds prior to planting the seeds. A liquid coating on agricultural seeds may contain growth promoting agents, nutrients, pesticides, chemicals or the like. When applying multiple products simultaneously it is desirable to mix all the liquid coatings and evenly distribute them to the seeds to ensure that a consistent proportion of each treatment liquid is applied to the seeds.

In a conventional seed treater, the liquid coatings are applied individually through their own nozzle or outlet hole which can results in uneven coatings on the seeds. The initial coating step is critical to obtaining even coatings. Mixing the seeds after the initial coating step can only correct for minor errors in application.

Alternatively, the two or more liquid coatings could be mixed in an additional container before application but this requires precise measuring and rigorous shaking of the container and the result is an inconvenient batch system. A batch system creates additional residence time of the mixture which is undesirable and can cause some of the treatment benefits to be neutralized.

Some coatings require diluting with water. The conventional technique is to mix in the water in an additional container before applying to the seeds. This also requires measuring out a precise volume of water and rigorous shaking of the container to fully mix the coating with the water.

Cleaning out traditional mixing chambers requires numerous disassembly steps with special care being required when removing the seals.

It would be desirable to improve the technology for mixing and applying multiple seed treatments as well as the cleanout process to address at least some of the issues outlined above.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

Disclosed herein is an atomizer mixing chamber, for an atomizer for use in a seed treater. The atomizer mixing chamber is configured to mix one or more treatment fluids, e.g. treatment liquids for coating seeds.

The atomizer mixing chamber may be designed to have multiple stages which may be arranged axially or radially or a combination thereof. The multiple stages may be defined by a plurality of cups (i.e. cup-like mixing chambers) or other such mixing structures that sequentially mix two or more treatment fluids prior to application to the seeds. The multi-stage atomizer mixing chamber not only efficiently and completely mixes the treatment fluids but its design also enables quick and easy disassembly for cleaning. The atomizer mixing chamber enables on-demand mixing of two or more fluids with a minimal pressure drop and also provides an evenly distributed output of the mixed fluid.

One inventive aspect of the present disclosure is an atomizer mixing chamber for a seed treater. The atomizer mixing chamber includes a body, a first inlet in the body for receiving a first treatment fluid and a second inlet in the body for receiving a second treatment fluid. The atomizer mixing chamber includes a first stage receptacle for receiving and combining the first and second treatment fluids to provide a combined fluid, the first stage receptacle comprising a first set of holes through which the combined fluid flows. The atomizer mixing chamber also includes a second stage receptacle for receiving the combined fluid from the first stage receptacle, wherein the second stage cup further mixes the combined fluid to provide a mixed fluid and wherein the second stage receptacle comprises a second set of holes through which the mixed fluid flows. The atomizer mixing chamber is designed to operate at as low a pressure as possible.

Another inventive aspect of the present disclosure is an atomizer that includes the atomizer mixing chamber described above. The atomizer further includes a disk below the atomizer mixing chamber for receiving the evenly distributed mixed fluid from the atomizer mixing chamber, a motor for rotating the disk and a drive shaft connecting the motor to the disk through a bore centrally disposed within the atomizer mixing chamber.

BRIEF DESCRIPTION OF THE DRAWINGS

Further features and advantages of the present invention will become apparent from the following detailed description, taken in combination with the appended drawings in which:

FIG. 1 is an isometric view of an atomizer mixing chamber in accordance with an embodiment of the present invention.

FIG. 2 is a cross-sectional view of the atomizer mixing chamber.

FIG. 3 is a top view of a first stage receptacle of the atomizer mixing chamber.

FIG. 4 is an isometric view of the first stage receptacle.

FIG. 5 is a top view of a second stage receptacle of the atomizer mixing chamber.

FIG. 6 is an isometric view of the second stage receptacle.

FIG. 7 is a top view of a third stage receptacle of the atomizer mixing chamber.

FIG. 8 is an isometric view of the third stage receptacle.

FIG. 9 is a top view of the first and second stage receptacle together as a single combined receptacle having two radially arranged stages.

FIG. 10 is an isometric view of the atomizer mixing chamber.

FIG. 11 is a cutaway view showing the interior of the atomizer mixing chamber.

It will be noted that throughout the appended drawings, like features are identified by like reference numerals.

DETAILED DESCRIPTION

Figure 1:
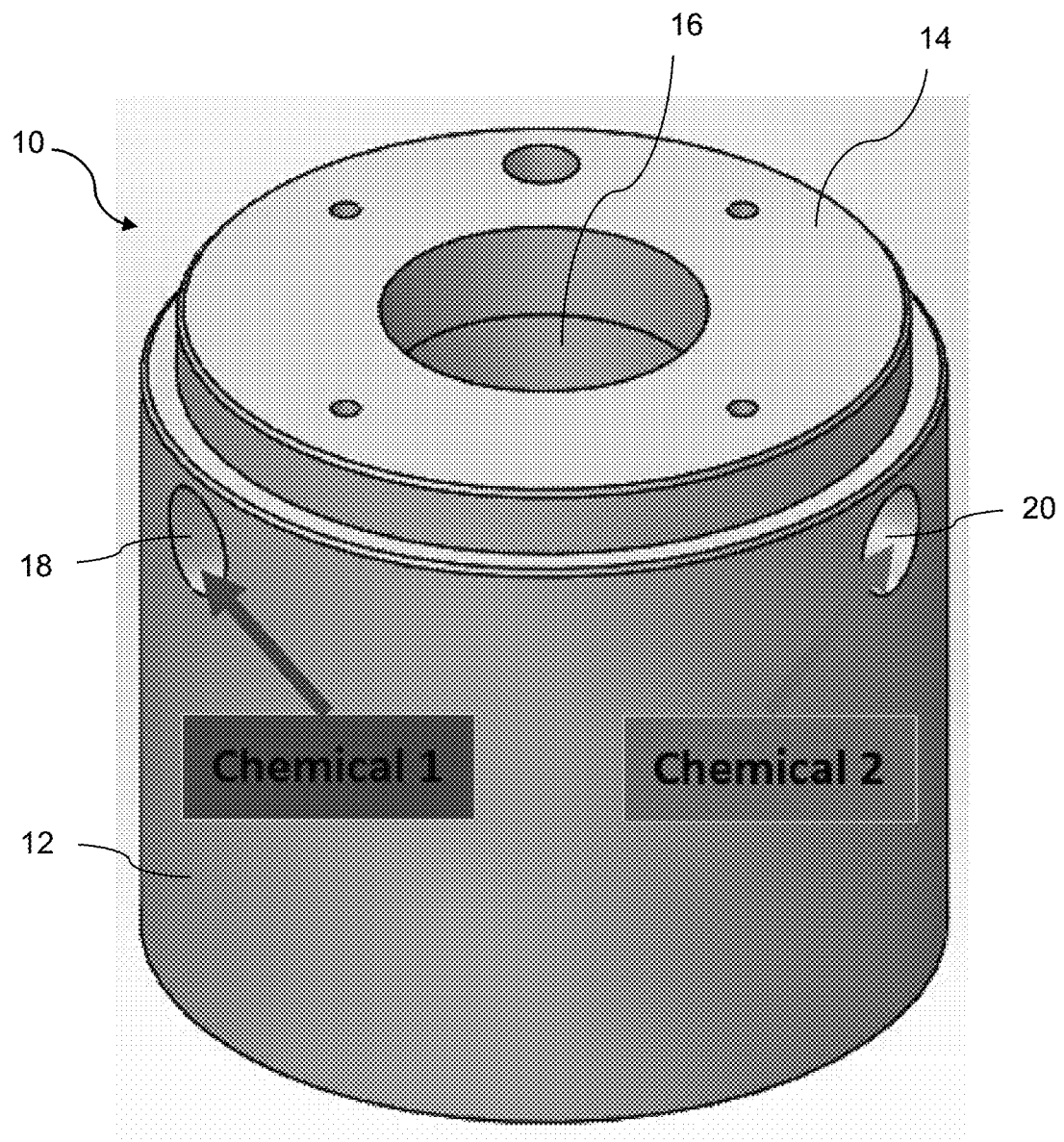
Figure 2:
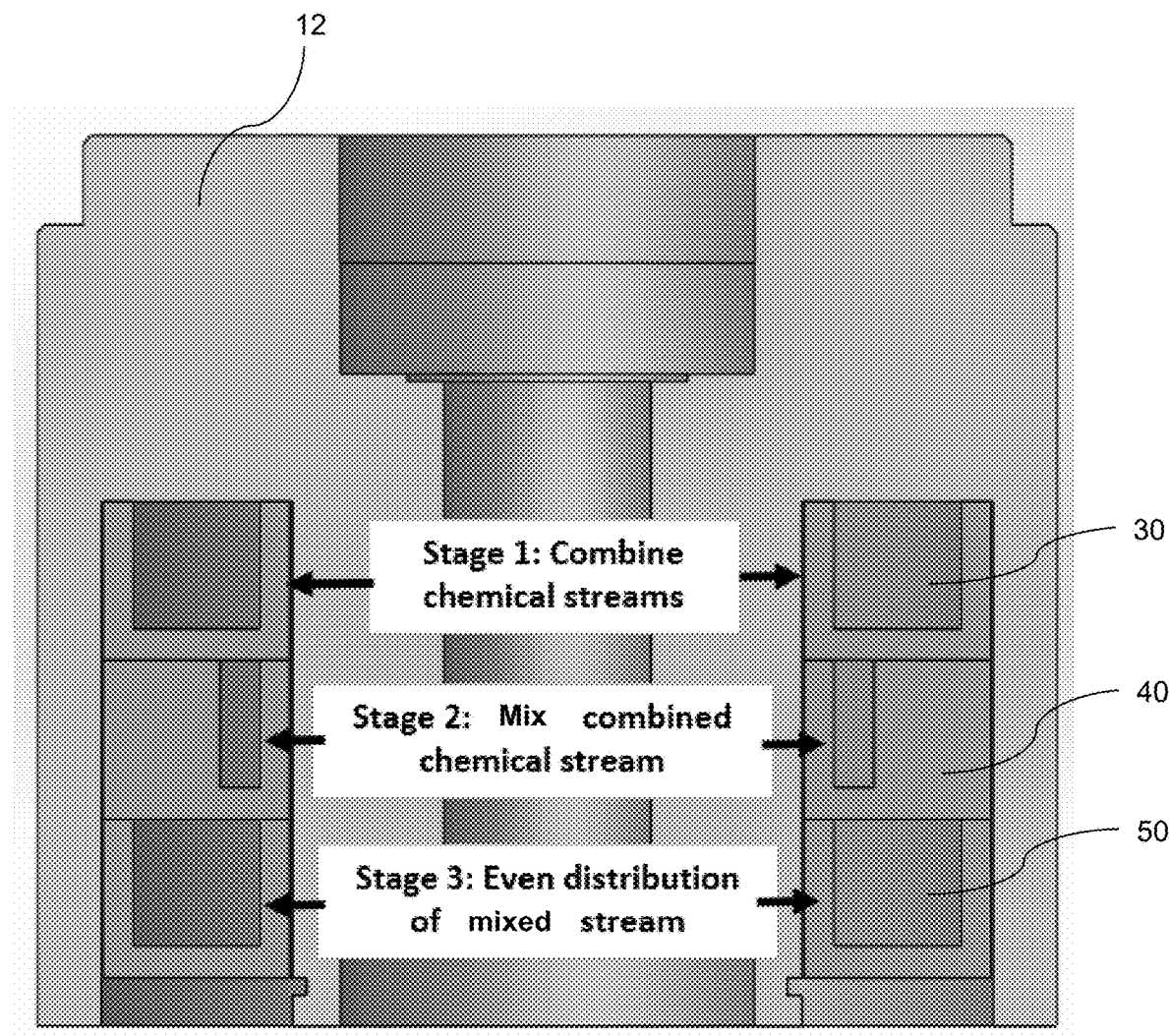
Figure 3:
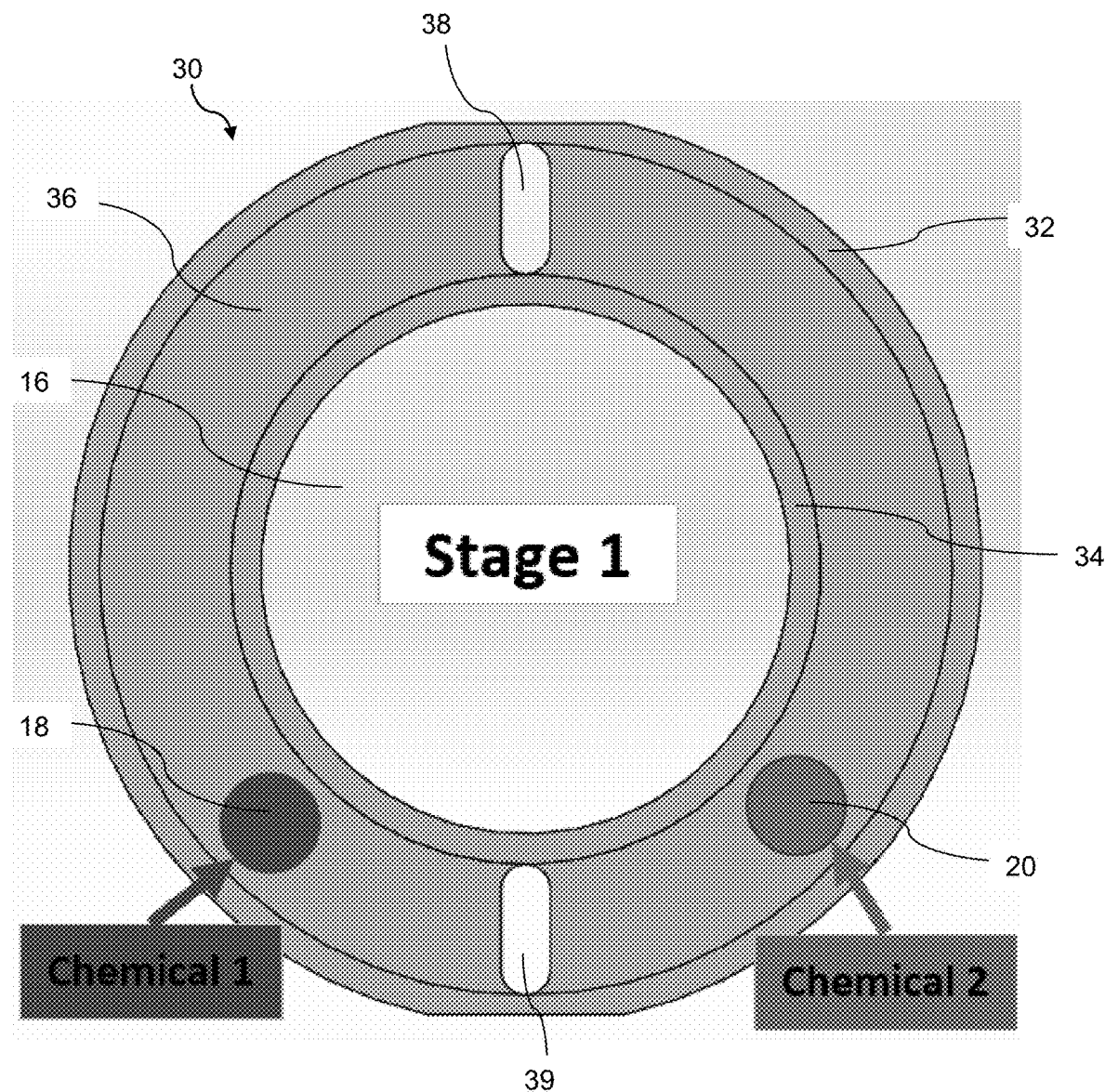
Figure 4:
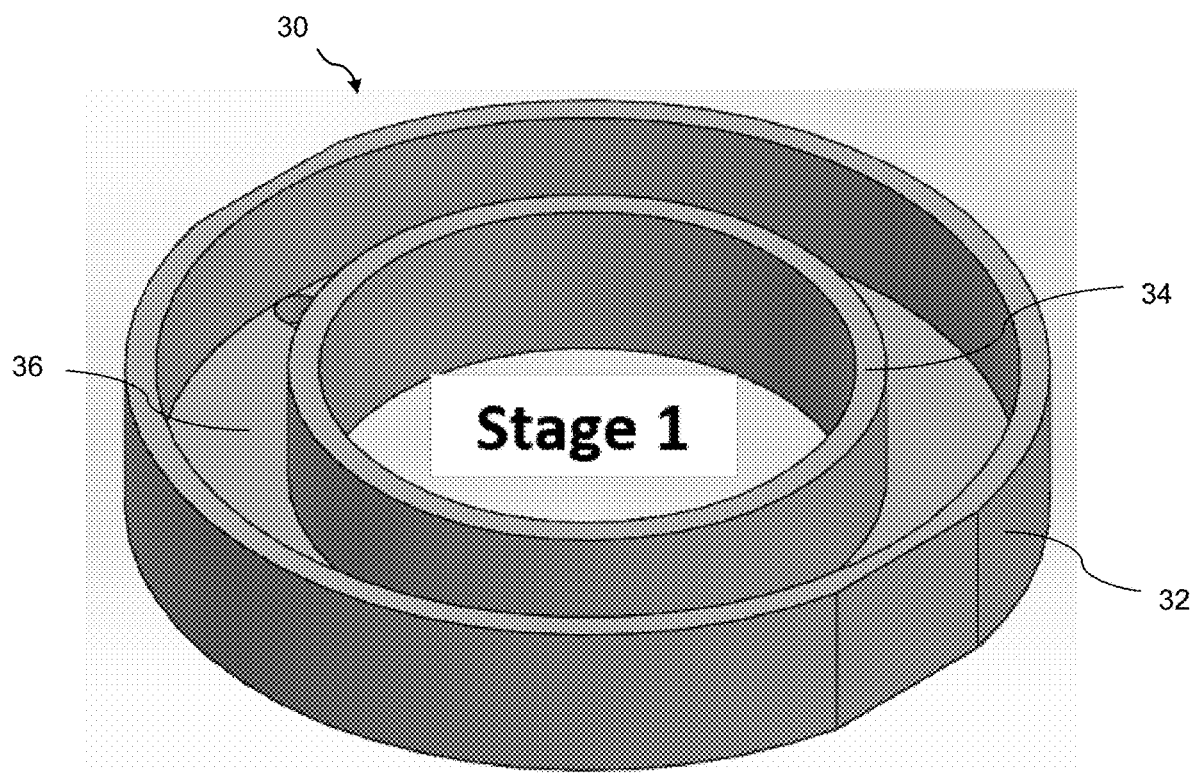
Figure 5:
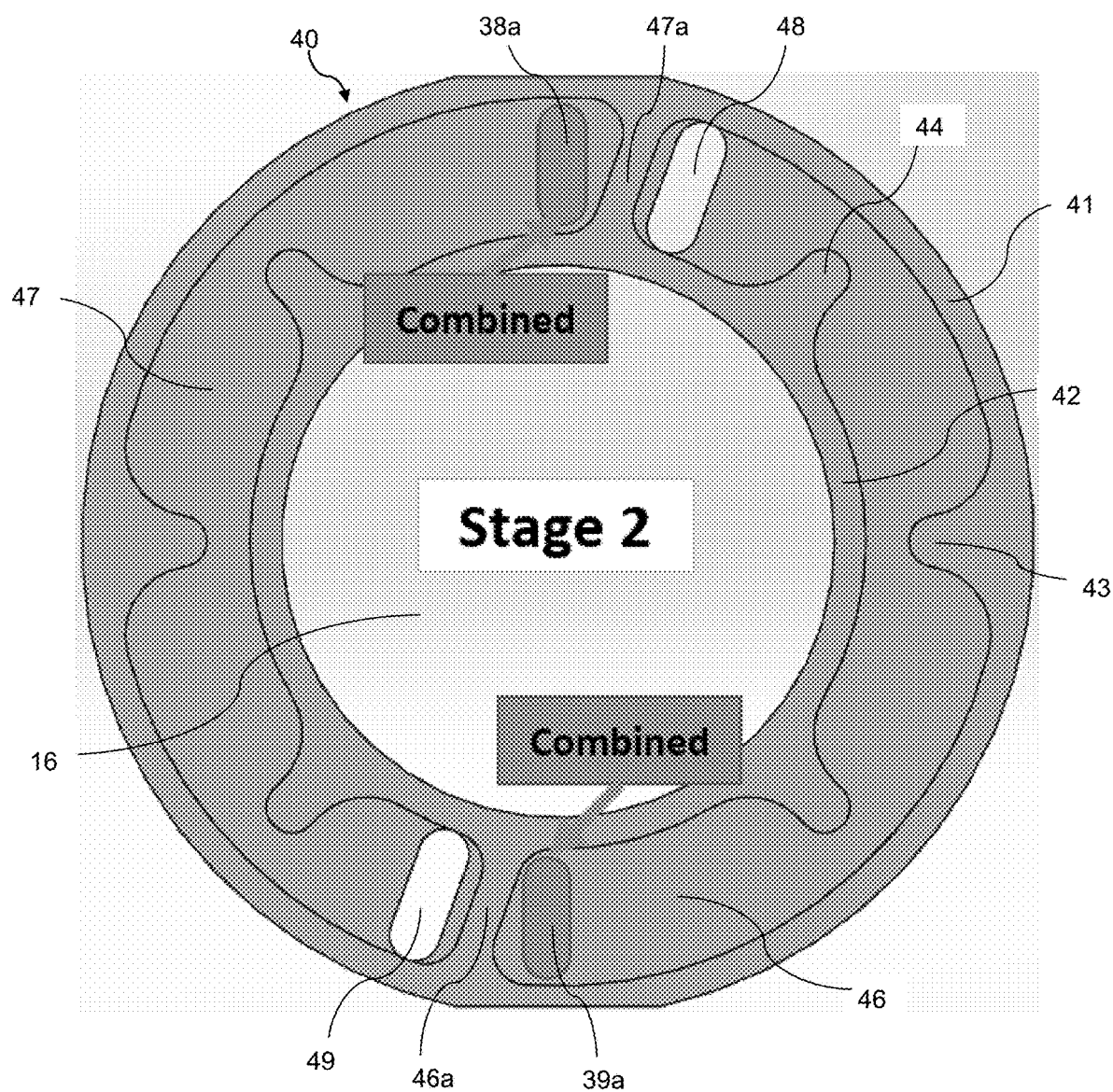
Figure 6:
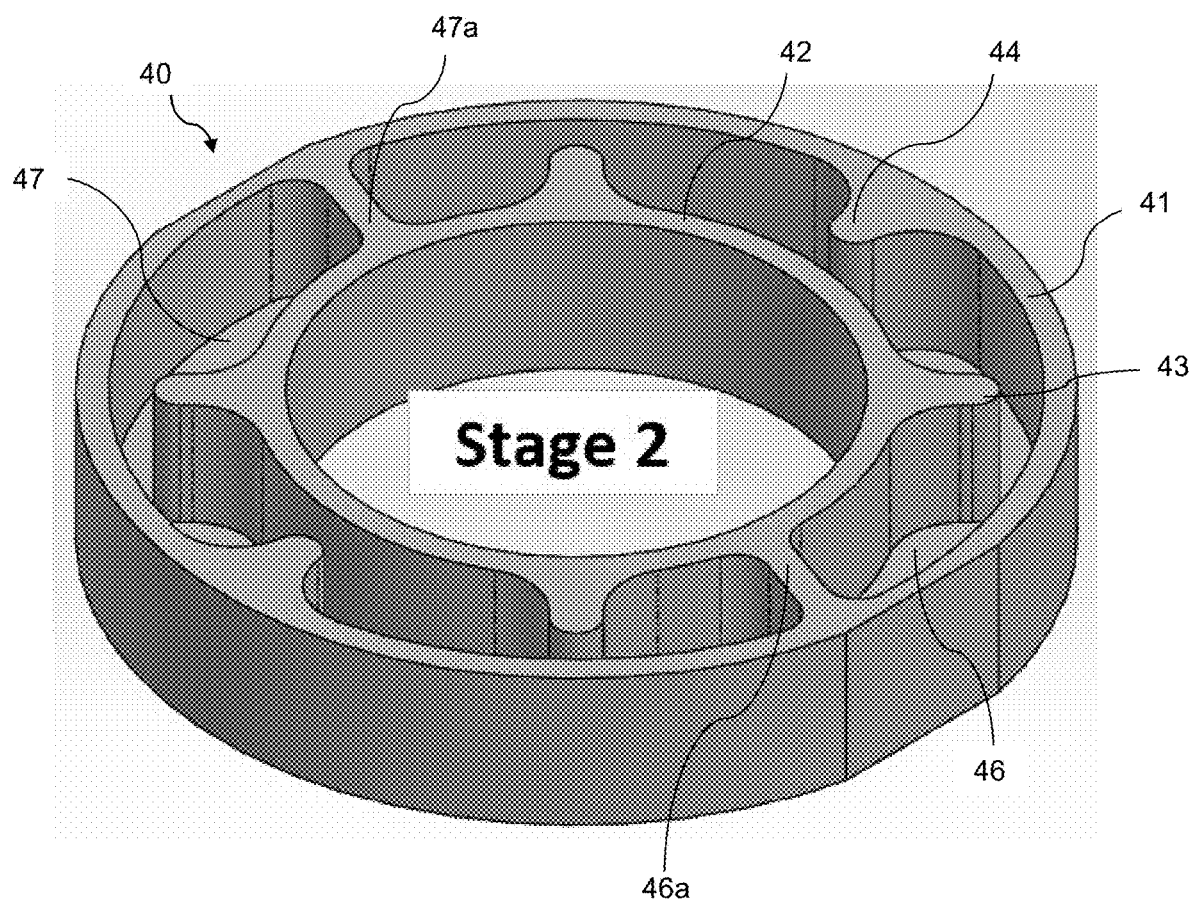

An atomizer mixing chamber for a seed treater, an atomizer incorporating the atomizer mixing chamber and an atomizing chamber are now described with reference to the exemplary embodiment(s) illustrated in the drawings.

FIG. 1 is an isometric view of an atomizer mixing chamber generally denoted by reference numeral 10 in accordance with an embodiment of the present invention. The atomizer mixing chamber 10 has a body (or main body) 12 and multiple stages defined by a plurality of receptacles that sequentially mix two or more treatment fluids, e.g. treatment liquids, prior to application to the seeds. The receptacles may be ring-like cups or annular cup-like structures as illustrated in the figures. The receptacles may alternatively have other shapes or geometries to achieve the same or similar functions. The treatment fluid may include a suspension or a slurry or even a powder-entrained air stream. The multi-stage atomizer mixing chamber not only efficiently and completely mixes the treatment fluids but its design also enables quick and easy disassembly for cleaning. The atomizing mixing chamber of FIG. 1 is designed particularly for mixing two treatment liquids and it will be appreciated that some modifications to the design might be needed to adapt the mixing chamber for non-liquid (gaseous) fluids. As shown by way of example in FIG. 1, the body 12 is generally cylindrical and has a top surface 14 that is flat and has internally threaded mounting holes for mounting to a motor (as described below in greater detail). Other body shapes may be used. The body also has a central bore 16 for receiving a drive shaft (as described in greater detail below). The body 12 includes a first inlet 18 in the body for receiving a first treatment liquid and a second inlet 20 in the body for receiving a second treatment liquid. Although two inlets 18, 20 are shown, it will be appreciated that, in another embodiment, the atomizer mixing chamber could have more than two inlets for receiving more than two different treatment liquids. In another embodiment, there may be only a single inlet. For example, the single inlet may be connected to a T-shaped fitting, manifold or equivalent device to receive two or more different treatment liquids via the same single inlet. The two or more different treatment liquids are then mixed in the atomizer mixing chamber 10.

FIG. 2 is a cross-sectional view of the body 12 in accordance with one exemplary embodiment showing three stages, namely a first stage 30, a second stage 40 and a third stage 50. The three stages are axially arranged in this exemplary embodiment. In another embodiment, the three stages can be arranged radially. In another embodiment, the first and second stages are arranged radially and the third stage is arranged axially.

In the embodiment depicted by way of example in FIG. 2, in the first stage, two or more treatment liquids are combined. In the second stage, two streams of the combined liquid are further mixed to form a mixed liquid (or blended liquid). The third stage distributes the mixed liquid evenly to the holes of the third stage for even application to the seeds. In at least one embodiment, the mixing can be done with only two stages; however, the best mode of implementing this invention is to employ three stages, as illustrated. More than three stages may also be employed in another embodiment. As described below, the stages can be defined by separate receptacles that sequentially mix the liquids. The receptacles may be embodied as ring-like cups or annular cup-like structures as shown by way of example in the figures. In this illustrated embodiment, there may be flats, bevels or other alignment devices on the cups (or other receptacles) to locate the outlet holes in relation to the inlet holes. This orientation is very important to enable proper mixing.

FIG. 3 is a top view of a first stage cup 30 of the atomizer mixing chamber in accordance with an exemplary embodiment. In this example, the first stage cup 30 has a pair of concentric walls, i.e. outer wall 32 and inner wall 34, defining an annular trough 36. In another embodiment, the trough can have a different shape, i.e. it need not be annular and the walls need not be concentric. The trough has a first set of holes, e.g. two oblong holes 38, 39. Other shapes of holes may be used. The first and second treatment liquids combine in the trough and flow out of the first stage cup 30 through these holes 38, 39.

FIG. 4 is an isometric view of the first stage cup 30 showing the concentric walls 32, 34 and the annular trough 36.

FIG. 5 is a top view of a second stage cup 40 of the atomizer mixing chamber in accordance with an exemplary embodiment. The second stage cup 40 includes by way of example a second pair of concentric walls, i.e. outer wall 41 and inner wall 42, having radial protrusions 43, 44 defining a second annular trough 46, 47 for mixing the combined liquid to form the mixed liquid. In the specific embodiment shown by way of example in FIG. 5, the trough is divided into two trough chambers 46, 47 by divider walls 46*a*, 47*a*. The second stage cup also has a second set of holes, e.g. two oblong holes 48, 49, through which the mixed liquid flows. The location, size and shape of the walls and holes can be varied in other implementations. FIG. 5 also shows the entry points of the combined liquid from the first stage, which are denoted by reference numerals 38*a*, 39*a*. In this embodiment, the entry points 38*a*, 39*a* are at opposite ends of the trough chambers 46, 47, thus requiring the combined liquid to flow past the protrusions to reach the exit holes 48, 49.

FIG. 6 is an isometric view of the second stage cup 40 in accordance with an exemplary embodiment showing the concentric walls 41, 42, the trough chambers 46, 47 and the dividing walls 46*a*, 47*a*. The radial protrusions 43, 44 promote mixing of the treatment liquid as the treatment liquid flows moves through the trough chambers 46, 47. The location, size and shape of the walls and holes can be varied in other implementations.

Figure 7:
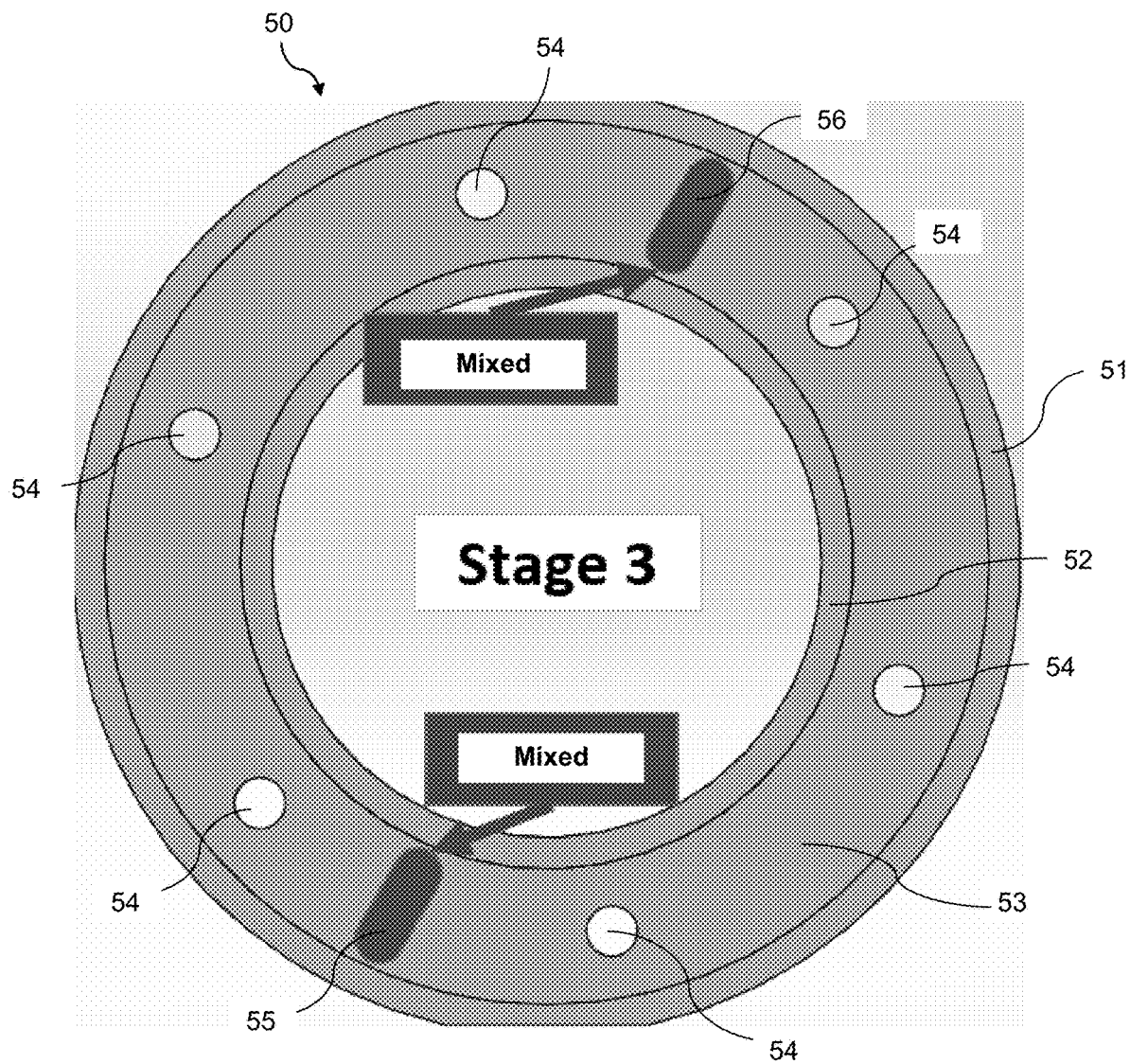

FIG. 7 is a top view of a third stage cup 50 of the atomizer mixing chamber. The third stage cup is below the second stage cup in this axially arrangement and forms an end cap for receiving the mixed liquid from the second stage cup. The third stage cup 50 includes, in this exemplary embodiment, a third pair of concentric walls, i.e. outer wall 51 and inner wall 52, defining a third annular trough 53. The third stage cup also includes a third set of holes 54 through which the mixed liquid exits from the atomizer. In the illustrated embodiment, there are six equally spaced circular holes. The geometry of the walls, the number of holes and their spacing may be varied in other embodiments. FIG. 7 shows the entry points 55, 56 of the mixed (blended) liquid from the second stage. The entry points are offset from the holes 54.

Figure 8:
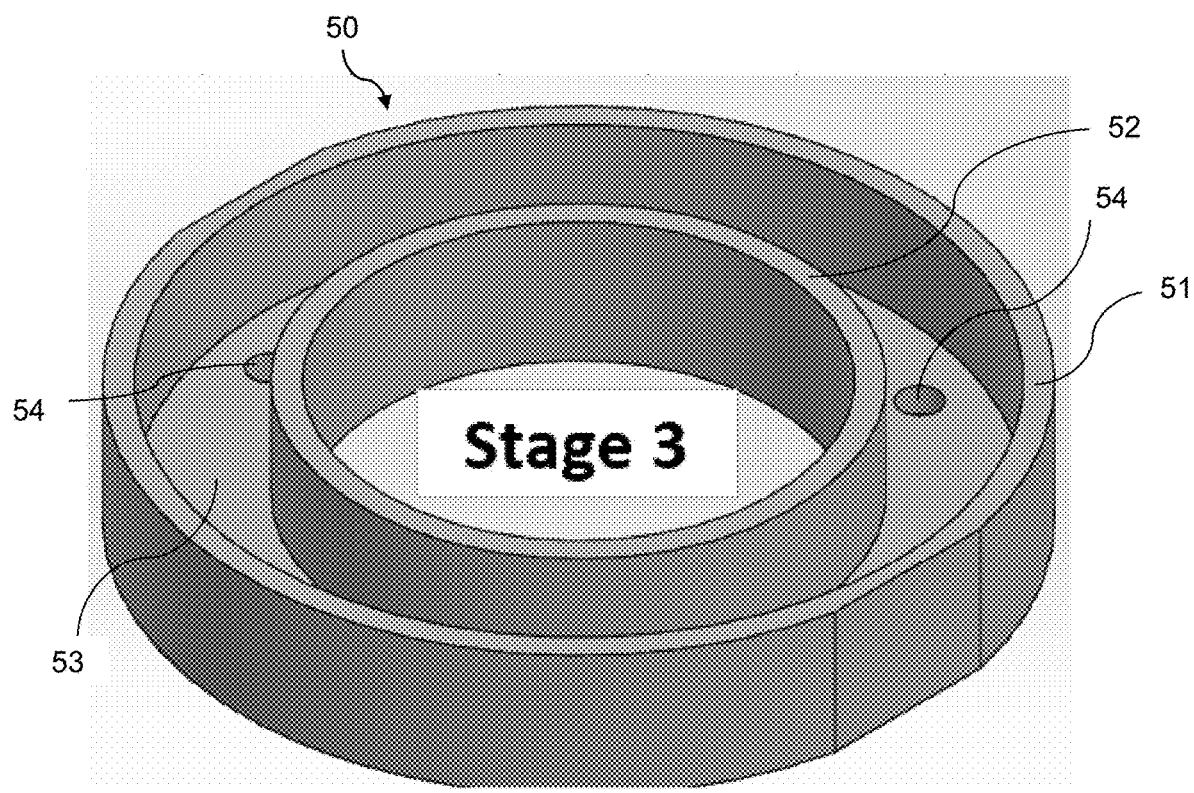

FIG. 8 is an isometric view of the third stage cup 50 showing the concentric walls 51, 52, the annular trough 53 and some of the holes 54. It is noted that not all holes are visible in this view.

Figure 9:
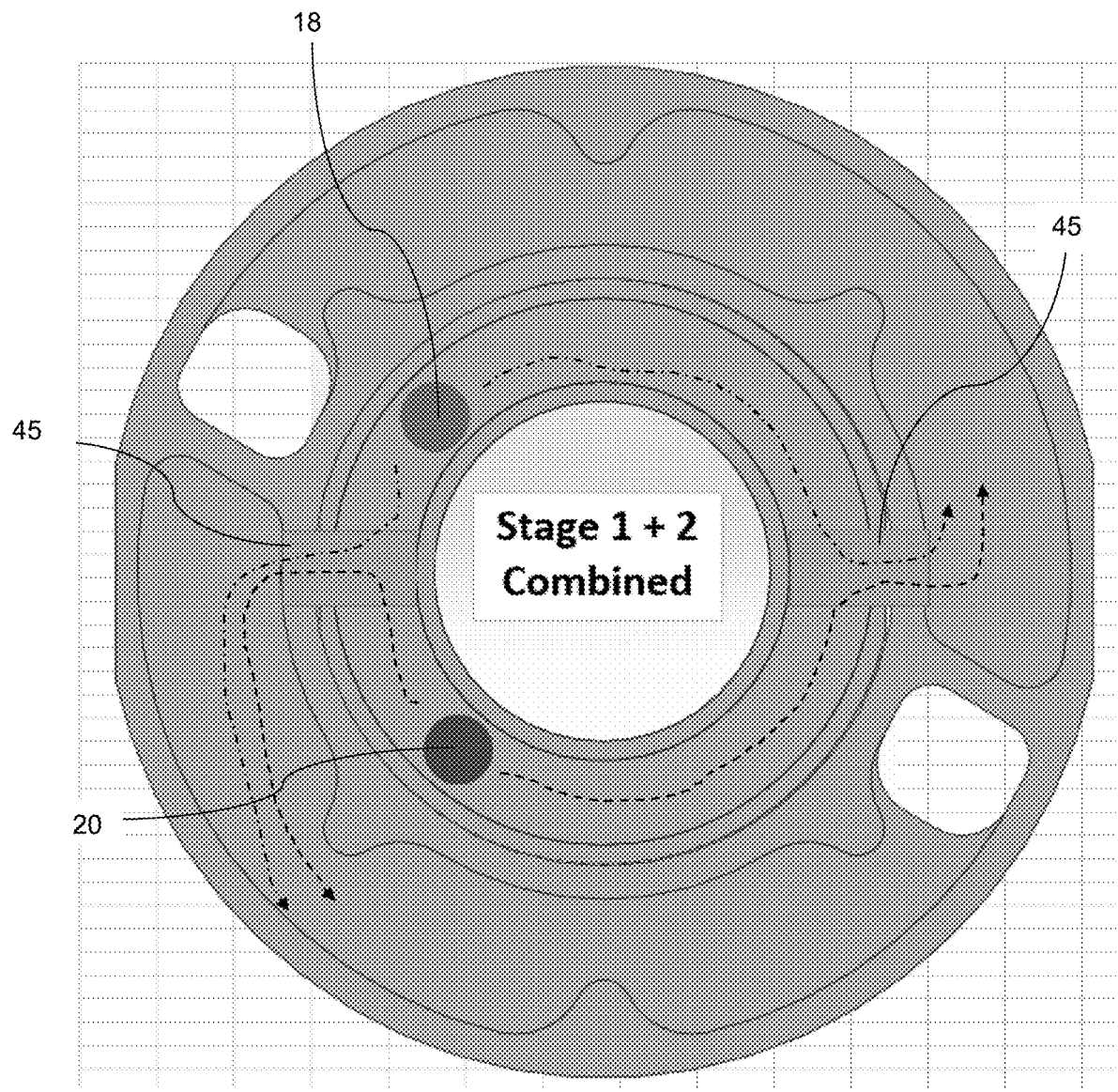

FIG. 9 is a top view of the first and second stage cups together showing the first and second inlets 18, 20. FIG. 9 shows a radial arrangement in which the liquids from inlets 18, 20 flow outwardly as shown by the dashed lines. The liquids flows through radial channels or holes 45 that extend from the first stage (radially inward stage) to the second stage (radially outward stage). In a variant, the liquids may flow in the opposite direction, i.e. from the outside toward the inside.

Figure 10:
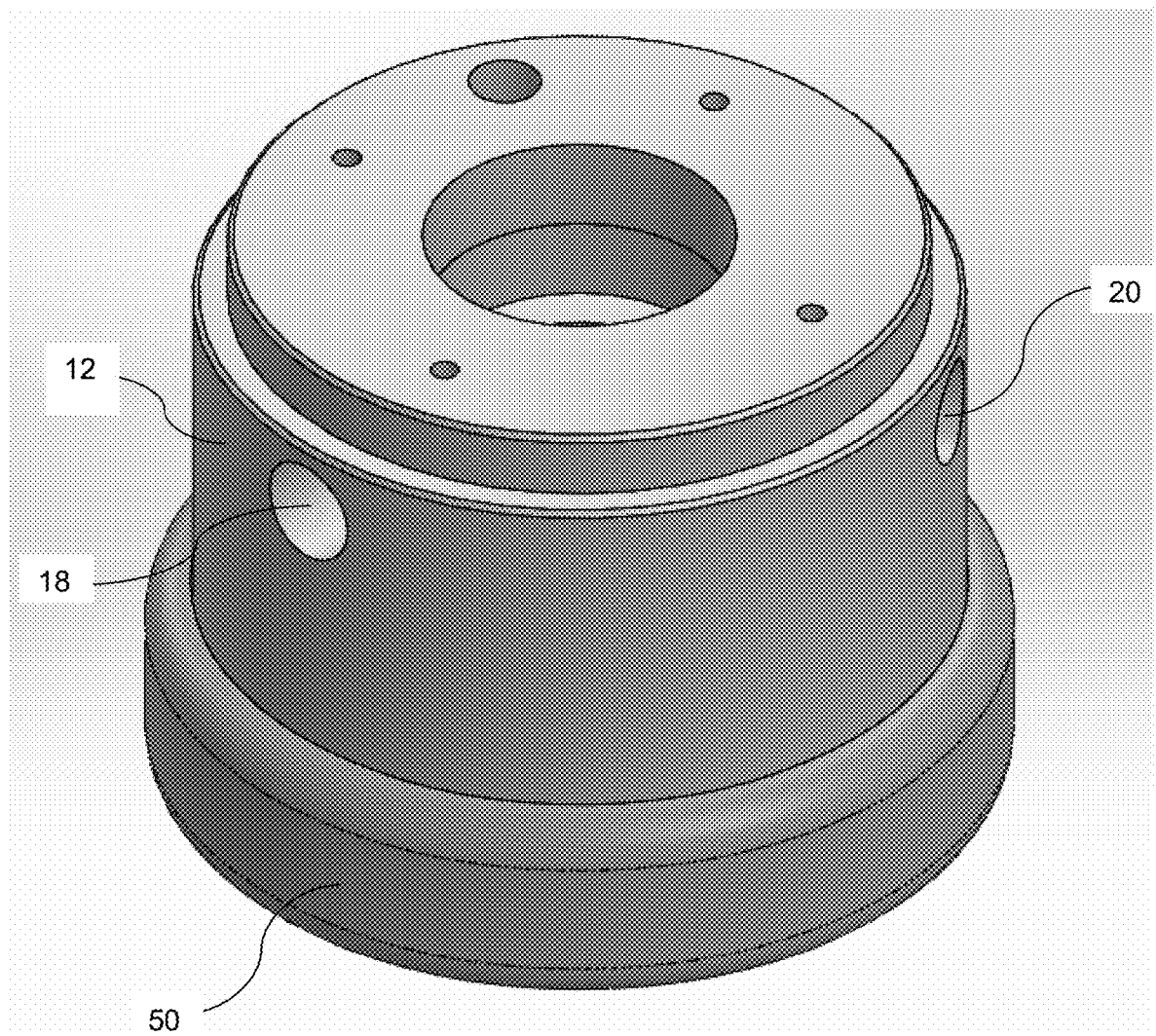

FIG. 10 is an isometric view of the atomizer mixing chamber showing the third stage cup 50 as an end cap having a wider diameter than the body 12.

Figure 11:
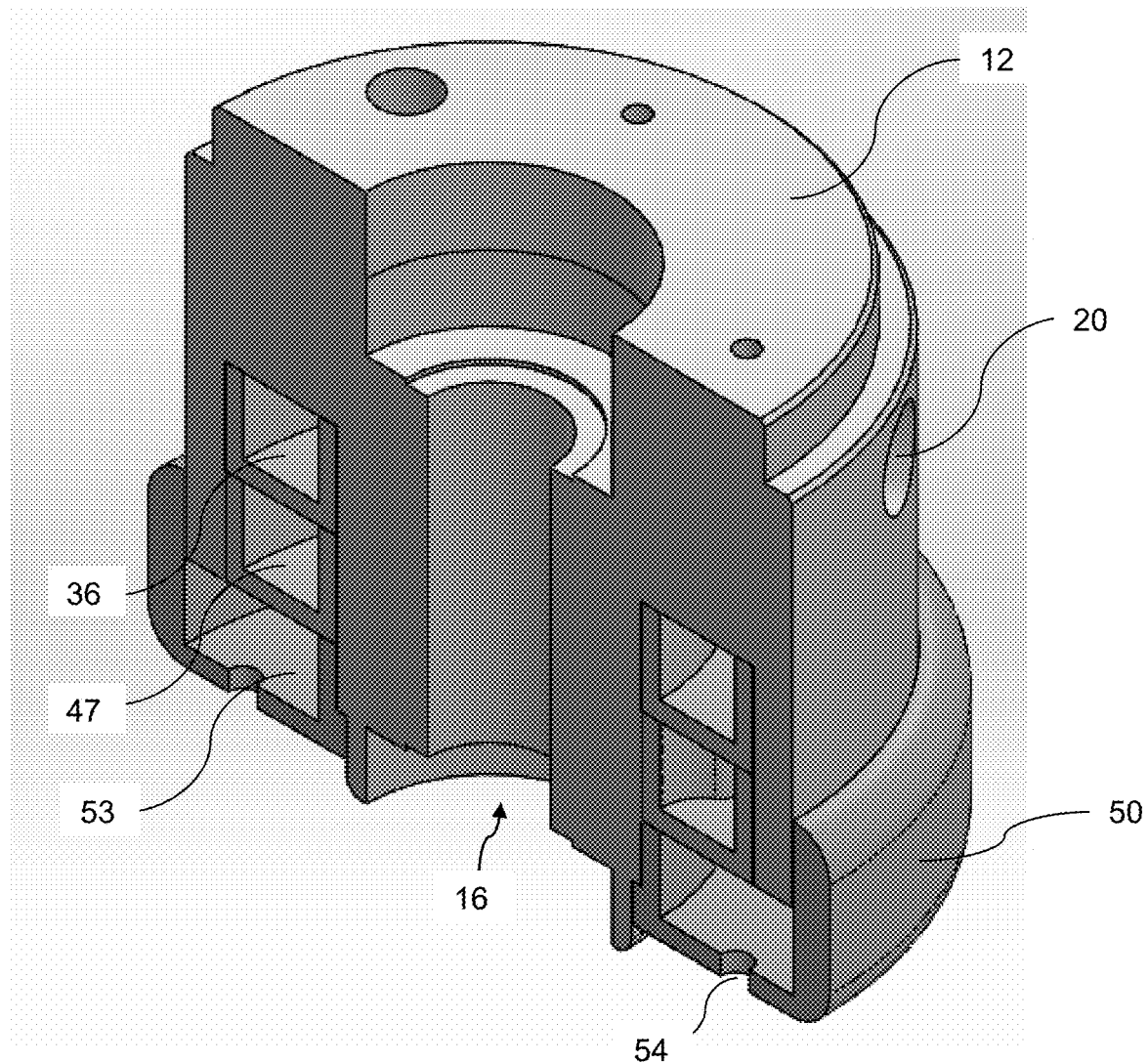

FIG. 11 is a cutaway view showing the interior of the atomizer mixing chamber and, in particular, the annular troughs 36, 47 and 53 of the three sequential stages of this exemplary embodiment. The third annular trough 53 has holes 54. A central bore 16 provides a space to receive a drive shaft as described below. In the foregoing illustrations, the first stage cup, second stage cup and third stage cup are separate components that provide three sequential receptacles for receiving and mixing the liquids. In another embodiment, the cups may be other receptacles having different shapes and geometries but which provide sequential mixing in an analogous manner. The receptacles may be separate components as are the ring-like cups shown in the figures. However, in another embodiment, the receptacles may be formed within a single, monolithic or integral part.

Figure 12:
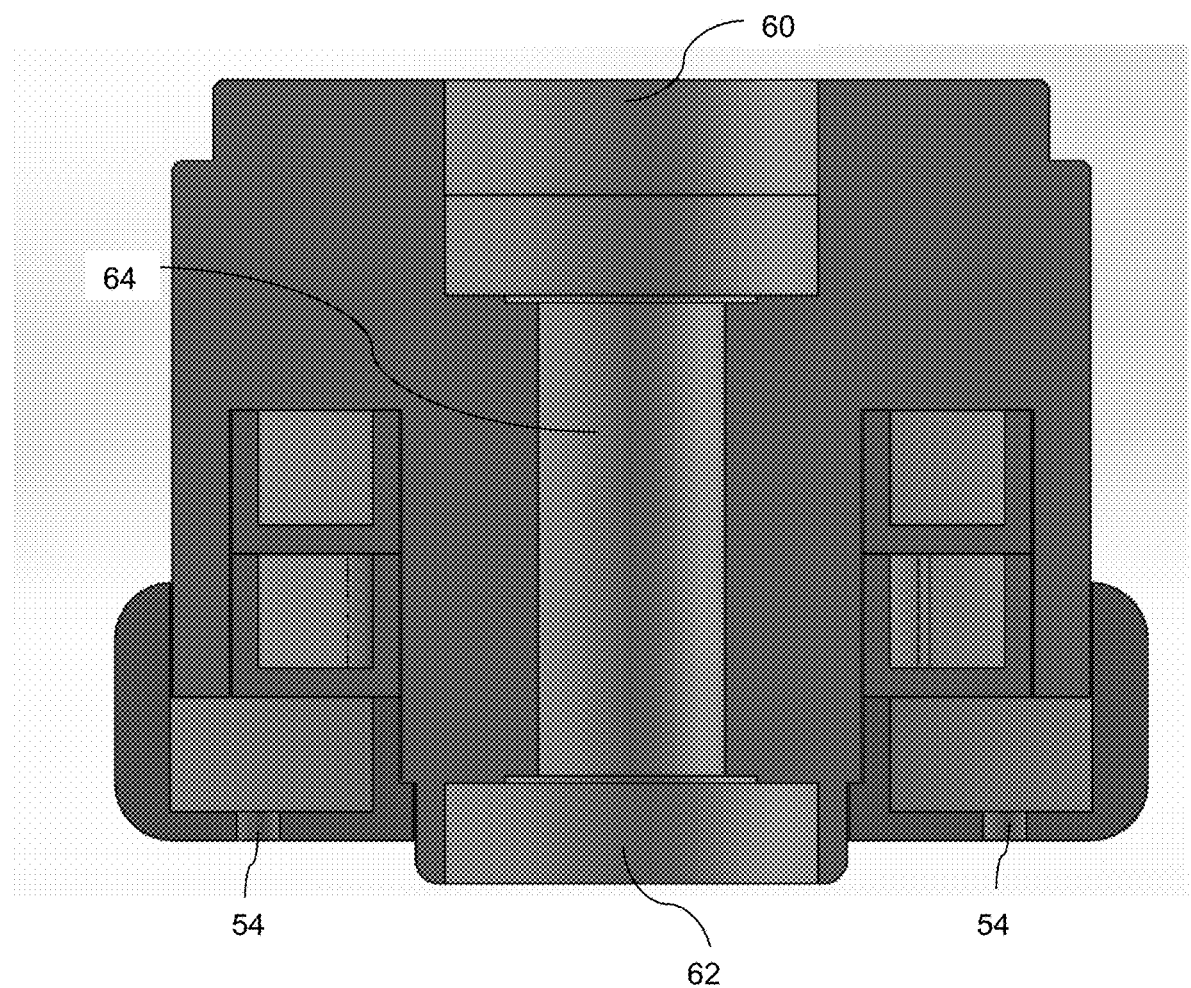
FIG. 12 is a cross-sectional view of the atomizer mixing chamber.

FIG. 12 is a cross-sectional view of the atomizer mixing chamber showing an upper bearing 60 (which may alternatively be a pair of bearings) and a lower bearing 62. The upper and lower bearings 60, 62 rotationally support a drive shaft 64 that fits through the bore 16 shown for example in FIG. 11.

Figure 13:
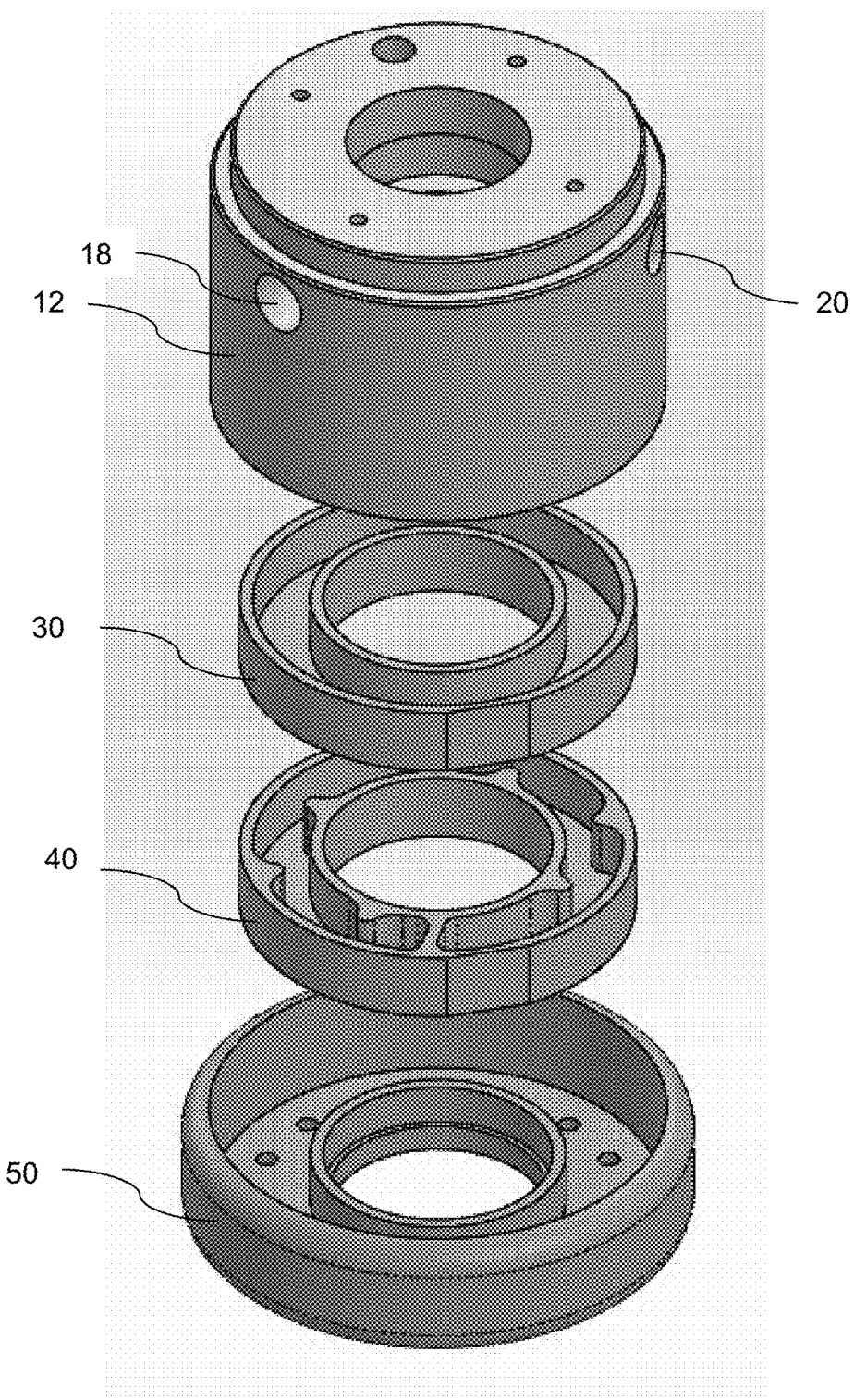
FIG. 13 is an exploded view of the atomizer mixing chamber.

FIG. 13 is an exploded view of the atomizer mixing chamber. To assemble the atomizer mixing chamber, the first and second stage cups 30, 40 are inserted into the body 12. The third stage cup (end cap) 50 is then threaded or otherwise removably attached to the bottom portion of the body to retain the first and second stage cups 30, 40 inside the body 12. It is noted that the end cap does not require a seal to achieve a fluid-tight enclosure.

Figure 14:
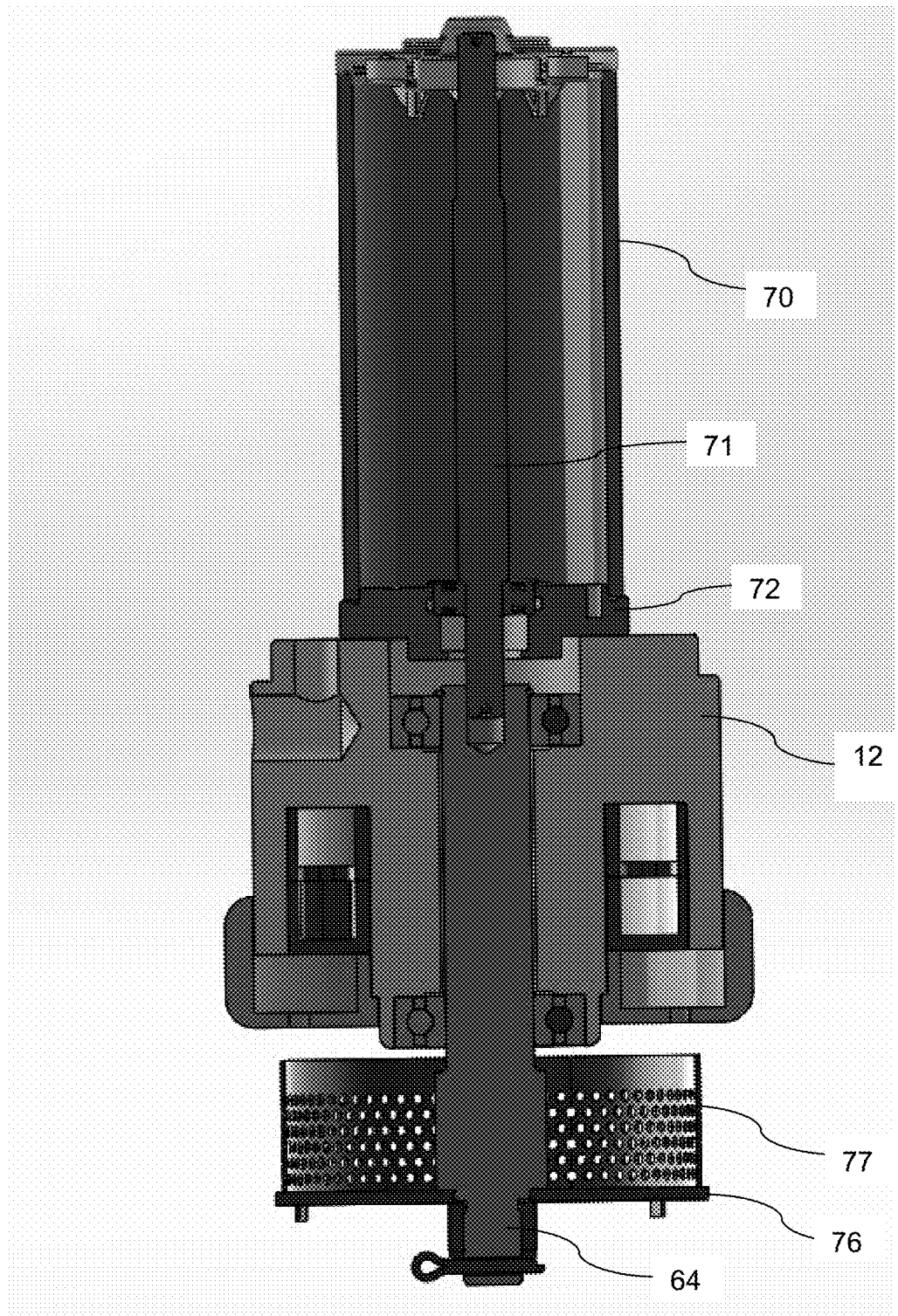
FIG. 14 is a cross-sectional view of an atomizer having the atomizer mixing chamber of the preceding figures.

FIG. 14 is a cross-sectional view of an atomizer showing the body 12 assembled to a motor 70 via an adapter plate 72. The motor may be an electric motor, e.g. a DC motor. In other embodiments, the motor may be replaced with another type of prime mover (with a suitable drive train or transmission) such as a hydraulic motor or pneumatic system. The motor of FIG. 14 has an output shaft 71 extending through the adapter plate 72 and connected to the drive shaft 64. The atomizer has a disk 76 (also known as a rotary disk or atomizer disk). The disk 76 includes a circular screen 77 (or perforated wall) extending around the periphery of the disk. The disk 76 is spaced below the holes of the third stage as shown.

Figure 15:
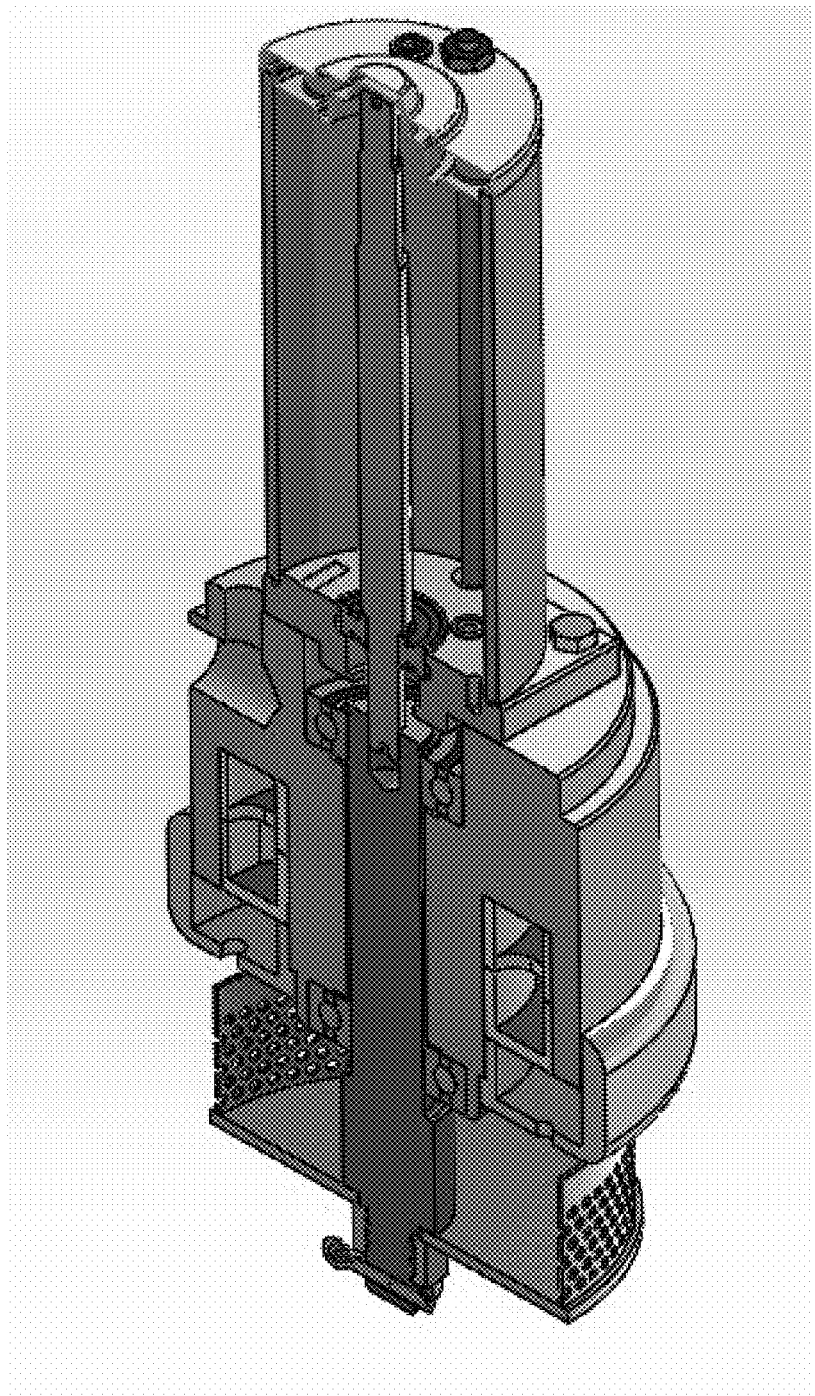
FIG. 15 is a cutaway view of the atomizer.

FIG. 15 is a cutaway view of the atomizer of FIG. 14 showing additional details of the atomizer. The motor, electronic components and the bearings for the atomizer are completely separated from the treatment fluids.

Figure 16:
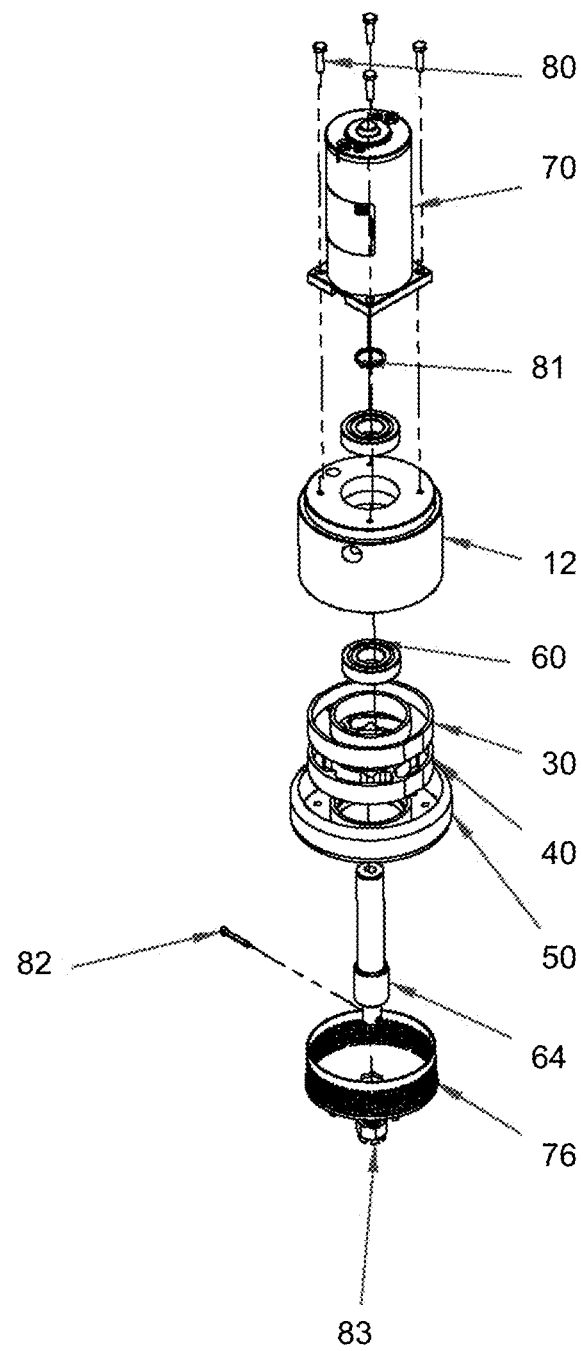
FIG. 16 is an exploded view of the atomizer.

FIG. 16 is an exploded view of the atomizer showing how the body 12, first stage cup 30, second stage cup 40 and third stage cup 50 are assembled in one particular example embodiment. FIG. 16 shows threaded fasteners 80 for connecting a lower flange of the motor 70 to the upper portion of the body 12 along with the bearing 60 and retaining ring 81. The bottom of the drive shaft 64 is connected to the disk 76 by a castle nut 83 and a cotter pin 82. Other fasteners and mechanical connectors may be substituted or used, as will be appreciated.

Figure 17:
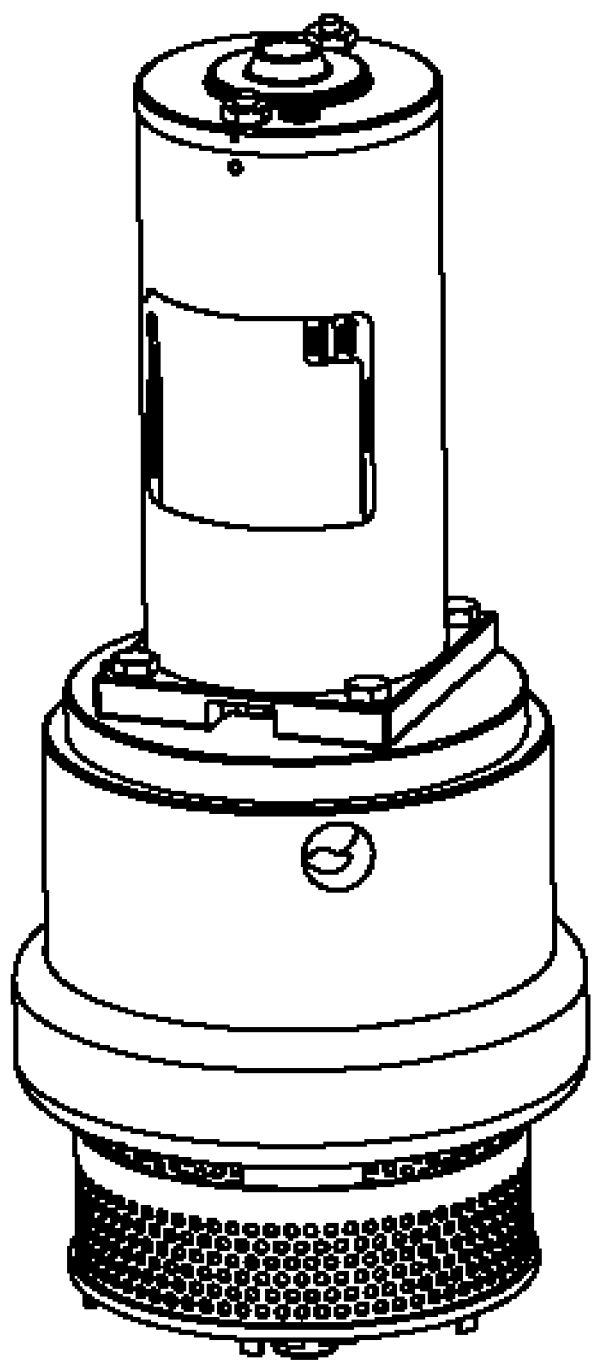
FIG. 17 is an isometric view of the atomizer.

FIG. 17 is an isometric view of the atomizer once assembled. The compact atomizer body means that there is less surface area for treatment build up and allows for a multitude of installation methods. The atomizer is smaller and lighter than any comparable device known to the inventors. The atomizer can be modified to permit higher or lower flow rates of treatment liquid or seed.

Figure 18:
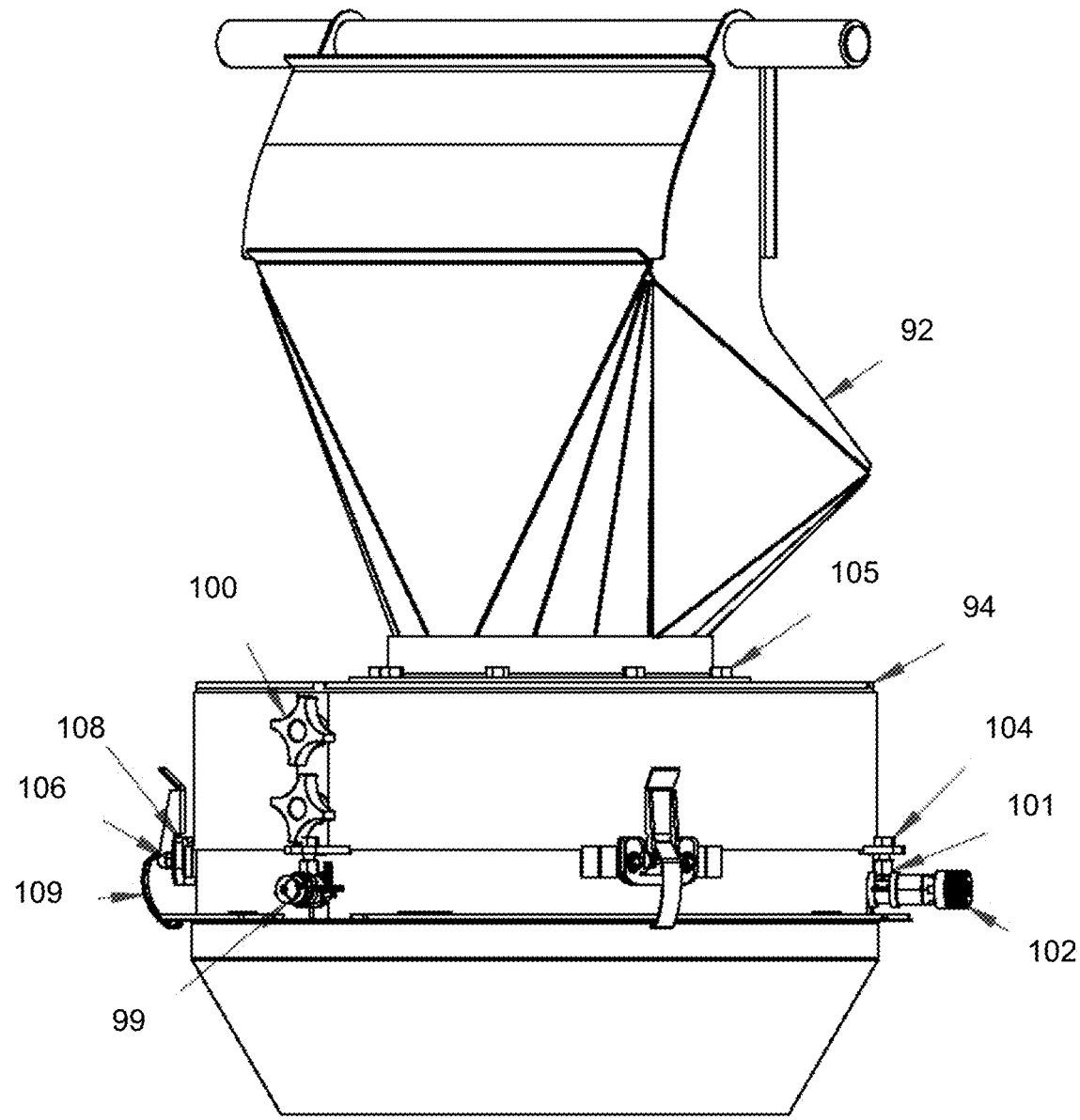
FIG. 18 is a side view of an atomizing chamber attached to a hood.
Figure 19:
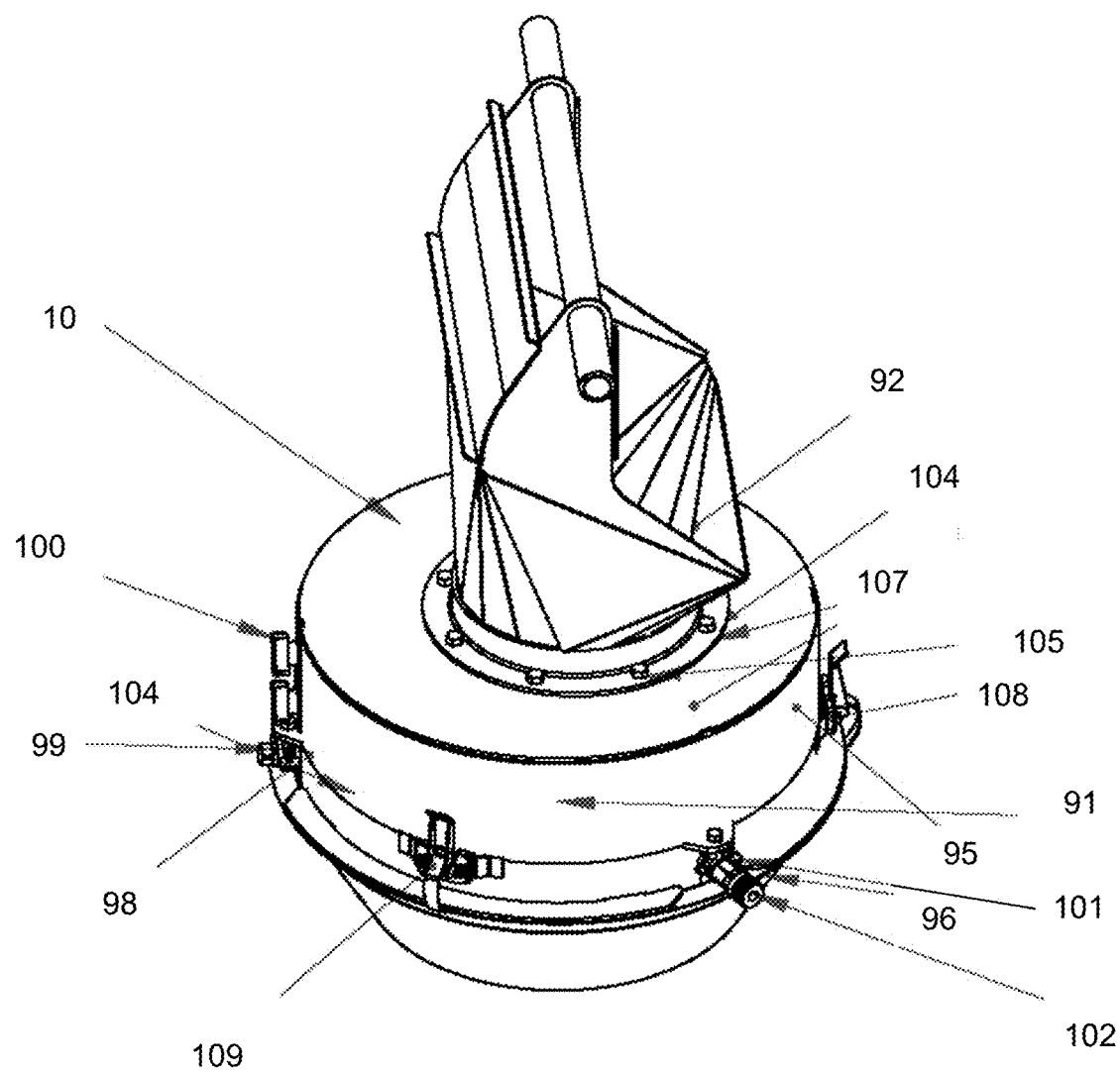
FIG. 19 is an isometric view of the atomizing chamber and hood.

FIGS. 18-19 are side and isometric views of an atomizing chamber attached to a hood 92. In the embodiment of FIGS. 18-19, the hood 92 is the inlet for the untreated seeds.

Figure 20:
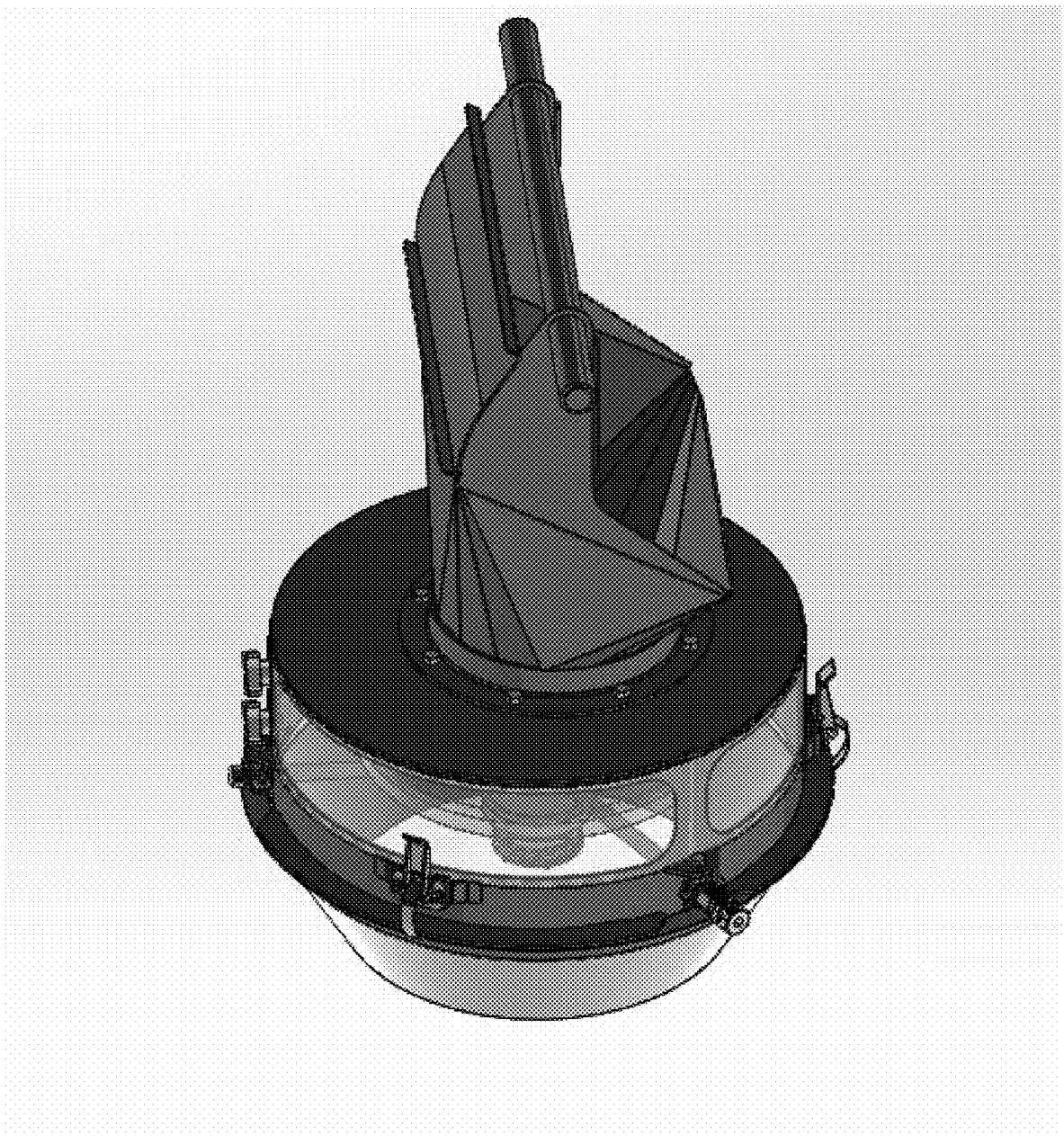
FIG. 20 is an isometric, partially transparent view of the atomizing chamber and hood.
Figure 21:
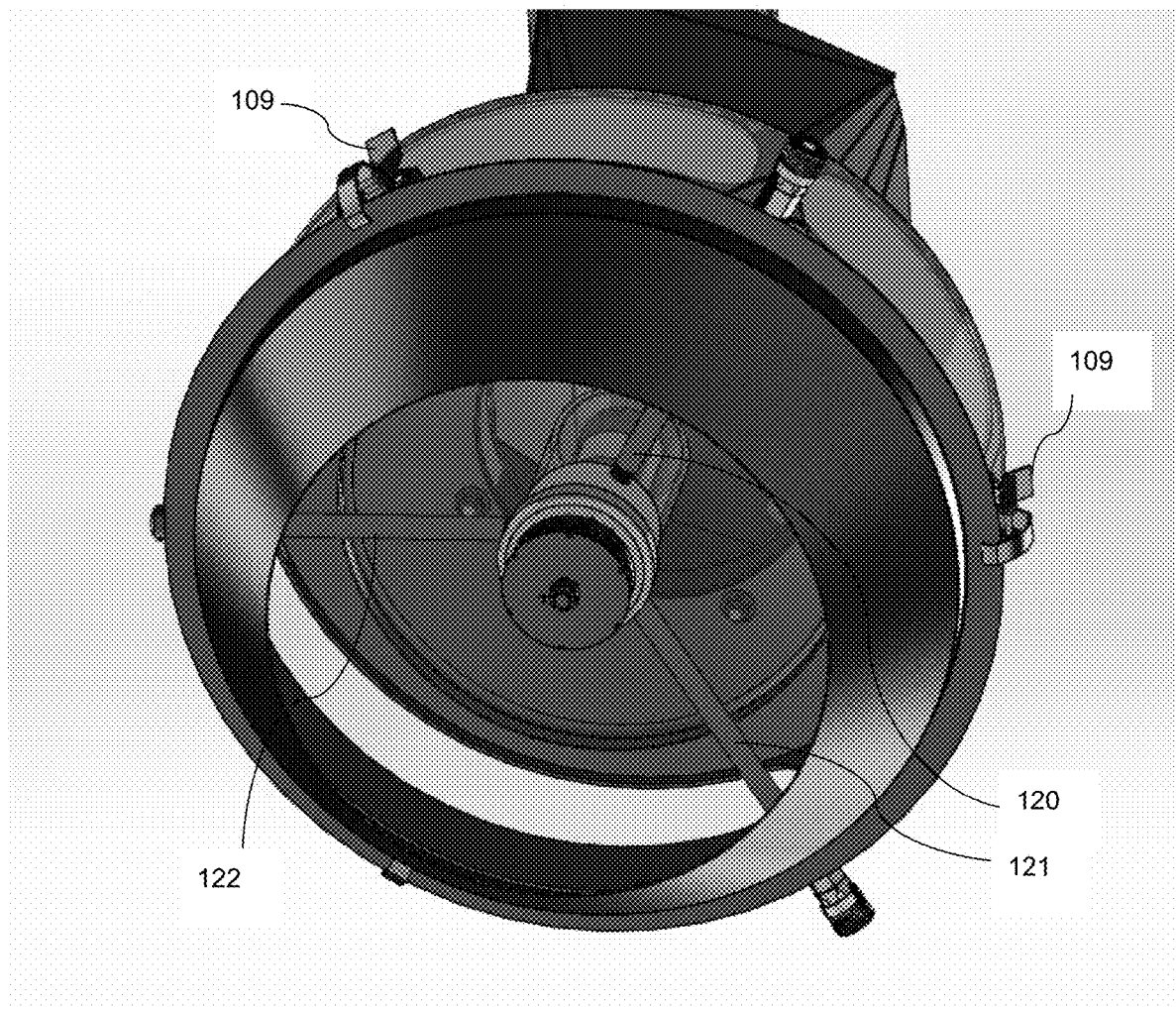
FIG. 21 is an isometric underside view of the atomizing chamber and hood.
Figure 22:
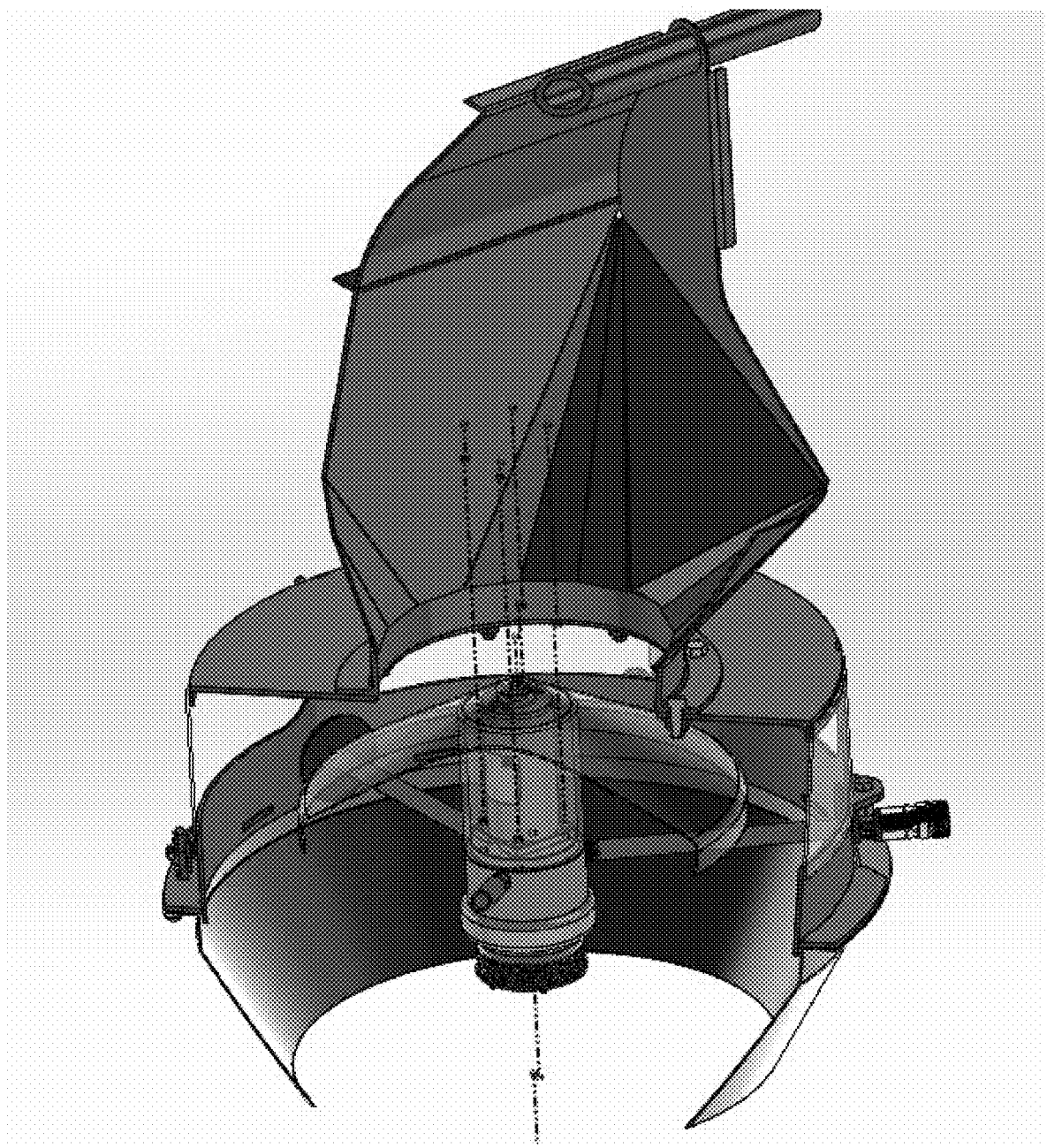
FIG. 22 is a cutaway view of the atomizing chamber and hood.

FIGS. 20-22 are further views of the atomizing chamber and the hood 92. In particular, FIG. 20 is an isometric, partially transparent view of the atomizing chamber. FIG. 21 is an isometric underside view of the atomizing chamber. FIG. 22 is a cutaway view of the atomizing chamber. As shown by way of example in FIG. 22, there are two cones: an upper cone above the atomizer distributes the seeds flowing from the inlet to form an annular flow of seeds through the atomizing chamber and past the atomizer disk. The conical shaped lower section of the atomizing chamber, i.e. the lower cone, redirects this annular flow back to the central discharge area of the atomizing chamber.

As shown in FIGS. 20-22, there are three pipes 120, 121, 122 protruding radially from the atomizer through the side of the atomizing chamber. These pipes contain the treatment fluids and electrical wiring for the motor. The pipes extend from the outside of the atomizing chamber to the atomizer. As such, during operation, the pipes extend through the annular seed flow. Two of the pipes 120, 121 connect to the first and second inlets 18, 20 of FIG. 1. The third pipe 122 contains the motor wiring. The pipes may have quick-connect fittings 102.

A plurality of retainers, e.g. tension clamps 109, which are disposed circumferentially around a main tubular housing of the atomizing chamber, hold the lower cone to the main tubular housing of the atomizing chamber as shown in FIG. 21.

From the foregoing description and drawings, it will be appreciated that the atomizer mixing chamber enables two or more treatment fluids, e.g. treatment liquids, to be mixed and/or diluted with water before application to the seeds. The treatment liquids are not just applied together in the same atomizing chamber but are mixed and blended together such that they become indistinguishable.

The mixing of two or more treatment liquids on demand obviates the need to make batches of treatment thinned with water or batches of treatment blends.

Another inventive aspect is distributing the treatment liquid through a series of small holes before it reaches the atomizing disk. Failure to do so results in thicker liquid application where the liquid transitions into the atomizer. Using the atomizer, the treatment liquid is distributed evenly on the seeds.

The atomizer body has a plurality of liquid lines attached to it. In the illustrated embodiment, these lines feed into a first stage cup which has outlet holes evenly spaced between the lines. Alternatively, the first stage could have been built with a secondary outer ring in place of the second stage cup.

Because the holes out of the first stage are evenly spaced between the inlet lines, the different treatment liquids will be forced to mix when they pass through the common hole. It is critical at this stage to get as much mixing as possible.

The first stage transitions into the second stage and is separated into multiple chambers. The number of chambers is selected to maximize the blending of the treatment liquids. The walls of this stage have protrusions to help fold the liquid mixture into itself such that the outlet of this stage is a well blended mixture.

The third (final) stage in this embodiment is where the mixed treatment liquids are distributed onto the atomizer disk. The third stage has a number of holes which are sized and distributed around the surface such that at the lowest expected flow rate liquid will come out each of the holes relatively evenly. The holes are sized such that there is limited pressure buildup inside the mixing chamber. A pressure buildup could result in one line back-feeding into another which could inadvertently pump the wrong treatment liquid into another tank.

The final stage is tightly connected, e.g. threaded, or otherwise retained by press fit, snap fit, nuts and bolts, etc, onto the main atomizer body such that no seal is required. Because the holes in all three stages have been sized to have little to no back pressure the treatment liquid is essentially dumped into a chamber at atmospheric pressure. This enables the flow of fluid to be restricted around the first stage cup and second stage cup without employing an expensive and cumbersome seal. The atomizer has two faces that mate closely creating enough resistance that the treatment liquid remains in the three cups (or other receptacles) as desired.

The atomizer mixing chamber disclosed in this specification is easy to clean. By simply removing the third stage cup ("end cap") the internal components can be quickly and easily removed for cleaning. For example, using a spanner wrench, the third stage cup can be easily removed from the atomizer body and then the first and second stage cups (which are floating cups) can be removed as well, thus enabling the user or operator to easily clean out the interior of the atomizer mixing chamber. Being easy-to-clean is very important for components in a seed treater that are in direct contact with seed or seed treatments to avoid contamination.

For optimal performance, it should also be noted that it is very important in the first stage to evenly split each treatment liquid (chemical) in half, so that equal amounts combine with one or more treatment liquids in the first stage, before entering the second stage for mixing. In other words, for optimal mixing of two treatment liquids, it is highly recommended that substantially 50% of the first seed treatment liquid and substantially 50% of the second treatment liquid go to each of the first and second outlets in the first stage. The illustrated embodiment is not limited to use with an atomizing disk or atomizing cup. The illustrated embodiment may be used with nozzles or machine holes that lead to a spray pattern onto the seeds.

One of the benefits of the atomizer mixing chamber is also having the point of mixing right before application. Some treatments interact so by having the mixing just prior to application, the effects of this interaction are minimized.

Conventional seed treatment technologies either apply insufficiently mixed liquids onto the seeds, and rely on post-application mixing (of the treated seeds) to evenly distribute the treatment, or they rely on pre-application batch mixing of the inputs (treatment liquids) in separate mix tanks. The new atomizer mixing chamber solves these problems by properly mix the treatment liquids "just in time" to enable a sufficiently mixed (homogenous) fluid to be applied to the seeds.

Being able to mix just-in-time, at the point of application, provides the following benefits: (i) it reduces waste (from mixing too much treatment in a pre-application batch system), (ii) it shortens the time from combining inputs to application, allowing certain treatments to be mixed that otherwise might not be possible, i.e. some combinations of inputs could become thick very quickly, or they could be unstable and separate, or they might be incompatible (e.g. a biological and a pesticide). If these treatment liquids were mixed in a batch system, they may not be fluid enough to pump, or might separate while pumping, or have undesired interactions. Mixing just before application shortens the time they are mixed, and reduces the distance they need to be pumped. The on-demand (just-in-time) mixing also improves uniformity of coverage, compared to post-application mixing of the treated seed, reduces the need for post-application mixing of the seed, and potential seed damage.

The ability of the atomizer mixing chamber to operate with minimal pressure loss is important for accurate metering in a wide range of fluid types and viscosities. Minimizing back pressure on the pumps is important to ensure good metering performance.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. An atomizer mixing chamber for a seed treater, the atomizer mixing chamber comprising: a body; a first inlet in the body for receiving a first treatment fluid; a second inlet in the body for receiving a second treatment fluid; a first stage cup for receiving and combining the first and second treatment fluids to provide a combined fluid, the first stage cup comprising a first set of holes through which the combined fluid flows; and a second stage cup below the first stage cup for receiving the combined fluid from the first stage cup, wherein the second stage cup further mixes the combined fluid to provide a mixed fluid and wherein the second stage cup comprises a second set of holes through which the mixed fluid flows.

2. The atomizer mixing chamber of claim 1 wherein the first stage cup comprises a first pair of concentric walls defining a first annular trough in which the first and second fluids combine to form the combined fluid.

3. The atomizer mixing chamber of claim 2 wherein the second stage cup comprises a second pair of concentric walls having radial protrusions defining a second annular trough for mixing the combined fluid to form the mixed fluid.

4. The atomizer mixing chamber of claim 3 further comprising a third stage cup below the second stage cup and forming an end cap for receiving the mixed fluid from the second stage cup, wherein the third stage cup comprises a third set of holes through which the mixed fluid exits from the atomizer mixing chamber and wherein the third stage cup comprises a third pair of concentric walls defining a third annular trough.

5. The atomizer mixing chamber of claim 1 further comprising a third stage cup below the second stage cup and forming an end cap for receiving the mixed fluid from the second stage cup, wherein the third stage cup comprises a third set of holes through which the mixed fluid exits from the atomizer mixing chamber.

6. The atomizer mixing chamber of claim 4 wherein the third stage cup comprises a third pair of concentric walls defining a third annular trough.

7. The atomizer mixing chamber of claim 1 wherein the first set of holes comprises two oblong holes, wherein the second set of holes comprises two oblong holes and wherein the third set of holes comprises more than two circular holes.

8. An atomizer for a seed treater, the atomizer comprising: an atomizer mixing chamber comprising: a body; a first inlet in the body for receiving a first treatment fluid; a second inlet in the body for receiving a second treatment fluid; a first stage cup for receiving and combining the first and second treatment fluids to provide a combined fluid, the first stage cup comprising a first set of holes through which the combined fluid flows; and a second stage cup below the first stage cup for receiving the combined fluid from the first stage cup, wherein the second stage cup further mixes the combined fluid to provide a mixed fluid and wherein the second stage cup comprises a second set of holes through which the mixed fluid flows; a disk for receiving the mixed fluid from the atomizer mixing chamber; a motor for rotating the disk; and a drive shaft connecting the motor to the disk through a bore centrally disposed within the atomizer mixing chamber.

9. The atomizer of claim 8 wherein the first stage cup comprises a first pair of concentric walls defining a first annular trough in which the first and second fluids combine to form the combined fluid.

10. The atomizer of claim 9 wherein the second stage cup comprises a second pair of concentric walls having radial protrusions defining a second annular trough for mixing the combined fluid to form the mixed fluid.

11. The atomizer of claim 10 further comprising a third stage cup below the second stage cup and forming an end cap for receiving the mixed fluid from the second stage cup, wherein the third stage cup comprises a third set of holes through which the mixed fluid exits from the atomizer mixing chamber and wherein the third stage cup comprises a third pair of concentric walls defining a third annular trough.

12. The atomizer of claim 11 wherein the first set of holes comprises two oblong holes, wherein the second set of holes comprises two oblong holes and wherein the third set of holes comprises more than two circular holes.

13. The atomizer of claim 8 further comprising a third stage cup below the second stage cup and forming an end cap for receiving the mixed fluid from the second stage cup, wherein the third stage cup comprises a third set of holes through which the mixed fluid exits from the atomizer mixing chamber.

14. The atomizer of claim 13 wherein the third stage cup comprises a third pair of concentric walls defining a third annular trough.

15. The atomizer of claim 13 wherein the first set of holes comprises two oblong holes, wherein the second set of holes comprises two oblong holes and wherein the third set of holes comprises more than two circular holes.

16. An atomizer for a seed treater, the atomizer comprising: an atomizer mixing chamber comprising: a body; a first inlet in the body through which a first treatment fluid enters the body; a second inlet in the body through which a second treatment fluid enters the body; a first stage cup fluidly connected to the first and second inlets to separately receive the first and second treatment fluids and to mix the first and second treatment fluids to provide an initially mixed fluid, the first stage cup comprising a first set of holes through which the initially mixed fluid flows; and a second stage cup below the first stage cup for receiving the initially mixed fluid from the first stage cup, wherein the second stage cup further mixes the initially mixed fluid to provide a further mixed fluid and wherein the second stage cup comprises a second set of holes through which the further mixed fluid flows; a disk for receiving the further mixed fluid from the atomizer mixing chamber; a motor for rotating the disk; and a drive shaft connecting the motor to the disk.

17. The atomizer of claim 16 further comprising a third stage cup below the second stage cup and forming an end cap for receiving the further mixed fluid from the second stage cup, wherein the third stage cup comprises a third set of holes through which the further mixed fluid exits from the atomizer mixing chamber, and wherein the third stage cup acts to evenly distribute the further mixed fluid amongst the third set of holes.

18. The atomizer of claim 17 wherein the first set of holes comprises two oblong holes, wherein the second set of holes comprises two oblong holes and wherein the third set of holes comprises more than two circular holes.

* * * * *